(12) United States Patent
Mitchell et al.

(10) Patent No.: US 6,534,554 B1
(45) Date of Patent: *Mar. 18, 2003

(54) MULTICOMPONENT ION EXCHANGE RESINS

(75) Inventors: Michael A. Mitchell, Lake Zurich, IL (US); Thomas W. Beihoffer, Arlington Heights, IL (US); Ralph Spindler, Lake Zurich, IL (US)

(73) Assignee: Basf Aktiengesellschaft, Ludwigshafen (DE)

( * ) Notice: Subject to any disclaimer, the term of this patent is extended or adjusted under 35 U.S.C. 154(b) by 44 days.

This patent is subject to a terminal disclaimer.

(21) Appl. No.: 09/583,116

(22) Filed: May 30, 2000

Related U.S. Application Data
(60) Provisional application No. 60/161,856, filed on Oct. 27, 1999.

(51) Int. Cl.[7] .................................................. B01J 43/00
(52) U.S. Cl. .............................. 521/28; 521/25; 521/29; 521/32; 521/33
(58) Field of Search .............................. 521/25, 28, 30, 521/32, 33, 34, 29

(56) References Cited

U.S. PATENT DOCUMENTS

| | | | |
|---|---|---|---|
| 2,783,212 A | 2/1957 | Schnell | |
| 3,041,292 A | 6/1962 | Hatch | 260/2.1 |
| 3,332,890 A | 7/1967 | Hatch | 260/2.1 |
| 3,645,922 A | 2/1972 | Weiss et al. | 260/2.1 R |
| 3,716,481 A | 2/1973 | Battaerd | 210/32 |
| 3,840,482 A | 10/1974 | Bolto et al. | |
| 3,901,236 A | 8/1975 | Assarsson | 128/284 |
| 3,957,698 A | 5/1976 | Hatch | 260/2.1 R |
| 4,139,499 A | 2/1979 | Wade et al. | 521/32 |
| 4,150,205 A | 4/1979 | Wheaton | 521/28 |
| 4,167,610 A | 9/1979 | Bolto et al. | 521/31 |
| 4,206,051 A | 6/1980 | Bolto et al. | 210/32 |
| 4,224,415 A | 9/1980 | Meitzner et al. | 521/38 |
| 4,229,545 A | 10/1980 | Eppinger et al. | 521/38 |
| 4,378,439 A | 3/1983 | Pilkington | 521/26 |
| 4,578,068 A | 3/1986 | Kramer et al. | 604/368 |
| 4,685,909 A | 8/1987 | Berg et al. | 604/360 |
| 4,818,598 A | 4/1989 | Wong | 428/284 |
| 5,026,800 A | 6/1991 | Kimura et al. | 526/200 |
| 5,075,399 A | 12/1991 | Ahmed et al. | 526/287 |
| 5,079,080 A | 1/1992 | Schwarz | 428/288 |
| 5,085,787 A | 2/1992 | Pinschmidt, Jr. et al. | 252/8.551 |
| 4,224,415 A | 7/1993 | Meitzner et al. | 521/38 |
| 5,274,018 A | 12/1993 | Tanaka et al. | 524/166 |
| 5,340,865 A | 8/1994 | Neff et al. | 524/922 |
| 5,384,343 A | 1/1995 | Farrar et al. | 524/556 |
| 5,409,771 A | 4/1995 | Dahmen et al. | 428/327 |
| 5,447,727 A | 9/1995 | Graham | 424/287 |
| 5,547,745 A | 8/1996 | Hansen et al. | 428/283 |
| 5,599,335 A | 2/1997 | Goldman et al. | 604/368 |
| 5,669,894 A | 9/1997 | Goldman et al. | 604/368 |
| 5,716,707 A | 2/1998 | Mukaida et al. | 428/402 |
| 5,759,373 A | 6/1998 | Terada et al. | 204/524 |
| 5,763,523 A | 6/1998 | Chen et al. | 524/922 |
| 5,804,605 A | 9/1998 | Palumbo | 521/28 |
| 5,849,862 A | 12/1998 | Davies et al. | 528/502 E |
| 5,962,578 A | * 10/1999 | Beilhoffer | 524/521 |
| 6,072,101 A | * 6/2000 | Beilhoffer | 604/372 |
| 6,235,965 B1 | * 5/2001 | Beilhoffer | 604/368 |

FOREIGN PATENT DOCUMENTS

| | | | |
|---|---|---|---|
| CA | 2066010 | 10/1992 | |
| DE | 43 33 056 | 3/1995 | |
| EP | 0 550 747 | 7/1993 | |
| EP | 0 700 672 | 3/1996 | |
| GB | 1 521 128 | 8/1978 | ............ C08F/8/00 |
| WO | WO 95/22358 | 8/1995 | |
| WO | WO 96/15162 | 5/1996 | |
| WO | WO 96/15163 | 5/1996 | |
| WO | WO 96/15180 | 5/1996 | |
| WO | WO 96/17681 | 6/1996 | |
| WO | WO 98/37149 | 8/1998 | |
| WO | WO 98/24832 | 11/1998 | |
| WO | WO 99/25393 | 5/1999 | ............ A61L/15/00 |

OTHER PUBLICATIONS

Kunin, The synthesis of ion exchange resins, *Ion Exchange Resins*, pp. 73–87 (1990)).

Encyclopedia of Chemical Technology, Fourth Edition, ed. M. Howe Grant, pp. 737–783 (1995).

Bolto et al., "Further rapidly reacting ion–exchange resins," *J. Polymer Sci.*, Symposium No. 55, 87–94 (1976).

Zhang et al., *Nature, 360*, 142–144 (1992).

Salamone et al., *Polym. Mater. Sci. Eng., 55*, 269–273 (1986).

McCormick et al., *Macromolecules, 21*, 694–699 (1988).

Bolto, *Polymeric Amines and Ammonium Salts*, Goethals, Ed., Paragon Press, New York, p. 365 (1979).

Bolto et al., *J. Polymer Sci.: Symposium Ser., 55*, 95–104, (1976).

Badesso et al., *Hydrophilic Polymers; Performance with Environmental Acceptability*, Glass, Ed., American Chemical Society (1996).

St. Pierre et al., *Polym. Amines Ammonium Salts, Invited Lect. Contrib. Pap. Int. Symp.*, Goethals, Ed., p. 245 (1980), meeting date 1979.

Chang et al., *Macromolecules, 20(3)*, 621–625 (1987).

Robeson, *J. App. Poly. Sci., 61*, 1561–1569 (1996).

* cited by examiner

*Primary Examiner*—Fred Zitomer
(74) *Attorney, Agent, or Firm*—Marshall, Gerstein & Borun

(57) ABSTRACT

Multicomponent ion exchange resin granules containing at least one acidic resin and at least one basic resin. Each granule contains at least one microdomain of the acidic resin in contact with, or in close proximity to, at least one microdomain of the basic resin.

32 Claims, 4 Drawing Sheets

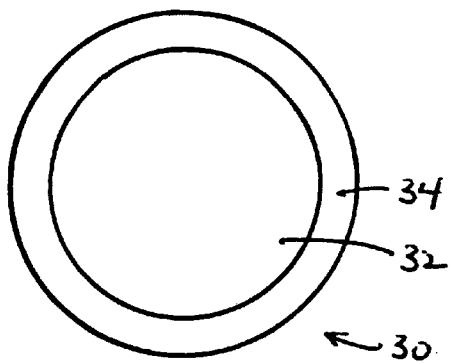
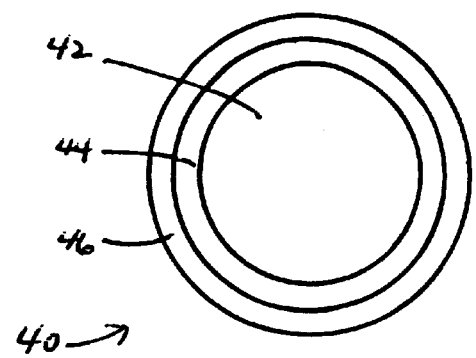
Fig. 3A
Fig. 3B
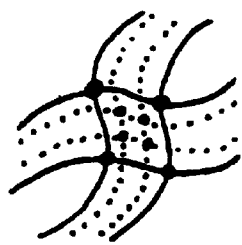
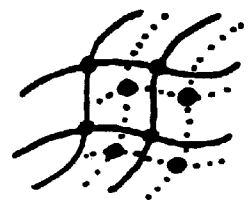
Fig. 5A
Fig. 5B

MULTICOMPONENT ION EXCHANGE RESINS

CROSS-REFERENCE TO RELATED APPLICATION

This application claims the benefit of provisional patent application Ser. No. 60/161,856, filed Oct. 27, 1999.

FIELD OF THE INVENTION

The present invention generally relates to multicomponent ion exchange resins comprising granules comprising at least one crosslinked acidic resin and at least one crosslinked basic resin. Each superabsorbent ion exchange granule has at least one microdomain of the acidic resin in contact with or in close proximity to, at least one microdomain of the basic resin. The ion exchange resins can be used, for example, in the purification of water, sugar refining, recovery of transition metals, recovery of proteins from fermentation broths and agricultural by-products, and in pharmaceutical separations technology.

BACKGROUND OF THE INVENTION

Ion exchange generally is defined as a reversible chemical interaction between a solid and a fluid, wherein selected ions are interchanged between the solid and fluid. An exemplary ion exchange process includes a exchange process wherein a fluid passes through a bed of porous resin beads having charged mobile cations or anions, such as hydrogen or hydroxide ions, which are available for exchange with metal ions or anions present in the fluid. The ion exchange resin readily exchanges hydrogen ions for the metal ions, or hydroxide ions for other anions, present in the fluid as the fluid passes through the bed.

In time, the number of hydrogen or hydroxide ions available for exchange with metal ions or other anions diminishes. Eventually, the resin becomes exhausted and cannot perform any further ion exchange (i.e., all available exchange sites are occupied). However, the resin can be regenerated. Regeneration is accomplished using a regenerant solution, which, in the case of a cation exchange resin, comprises an acid, i.e., a large excess of hydrogen ions, that is passed over the ion exchange beads and drives the collected ions from the resin, thereby converting the ion exchange resin back to its original form.

A specific example of a cation exchange process is the purification/softening of tap water. In this process, weak acid ion exchange resins use carboxyl radicals, in the sodium form, as the cation exchange site. The sodium ions are the charged mobile cations. Alkaline earth metals, such as calcium and magnesium, present in the tap water are exchanged for the sodium cations of the resin as the water passes through a bed of the ion exchange resin beads. Removal of calcium and magnesium ions from water in exchange for sodium ions via weak acid cation exchange resins is not limited to the water purification/softening applications, but also includes the softening of fluids, such as clay suspensions, sugar syrups, and blood, thereby rendering the fluids more amenable to further processing. When the exchange capabilities of the ion exchange resin are exhausted, a weak acid can be used to regenerate the acid form of the resin, followed by conversion of the acid form of the resin to the sodium form with dilute sodium hydroxide.

Similarly, an anion exchange resin containing anionic radicals removes anions, like nitrate and sulfate, from solution. Anion exchange resins also can be regenerated with a sodium hydroxide solution, for example.

The reversibility of the ion exchange process permits repeated and extended use of an ion exchange resin before replacement of the resin is necessary. The useful life of an ion exchange resin is related to several factors including, but not limited to, the amount of swelling and shrinkage experienced during the ion exchange and regeneration processes, and the amount of oxidizers present in a fluid passed through the resin bed.

Cation exchange resins typically are highly crosslinked polymers containing carboxylic, phenolic, phosphonic, and/or sulfonic groups, and roughly an equivalent amount of mobile exchangeable cations. Anion exchange resins similarly are highly crosslinked polymers containing amino groups, and roughly an equivalent amount of mobile exchangeable anions. Suitable exchange resins, preferably, (a) possess a sufficient degree of crosslinking to render the resin insoluble and low swelling; (b) possess sufficient hydrophilicity to permit diffusion of ions throughout its structure; (c) contain sufficient accessible mobile cation or anion exchange groups; (d) are chemically stable and resist degradation during normal use; and (e) are denser than water when swollen.

Hatch U.S. Pat. No. 3,957,698 discloses production of weak acid ion exchange resins by the suspension copolymerization of methacrylic or acrylic acid, in a low molecular weight hydrocarbon diluent, with 0.5 to 10 wt. % of divinylbenzene, based on the weight of initial monomers, to achieve the proper degree of crosslinking. In order to prepare high purity ion exchange resins by this process, the resin is heated at a high temperature or is extensively washed with solvents to remove the diluent. The resin particles were in the size range of 2 to 5 microns.

Meitzner et al. U.S. Pat. No. 4,224,415 discloses the preparation of ion exchange particles prepared by suspension copolymerization of water-insoluble monomers, such as methyl acrylate and methyl methacrylate, with a crosslinking agent, such as divinylbenzene. In addition, a precipitant is added to the monomer phase to impart a reticular nature to the resulting particles. This process requires a divinylbenzene content in the range from 8 to 25 wt. % to prepare the desired materials. The particles must be hydrolyzed with a strong base in order to prepare a material with exchangeable functionalities.

Therefore, conventional weak acid cation exchange resins typically are produced using a multistep process. The first step is a batch, aqueous suspension polymerization of methyl acrylate monomer, in the presence of divinylbenzene, to provide crosslinked beads of methyl acrylate. The poly(methyl acrylate) beads then are reacted with sodium hydroxide to hydrolyze the ester groups of the poly(methyl acrylate), and thereby introduce carboxylate (i.e., weak acid) functionality into the beads. Due to solubility of the acrylic acid in the aqueous phase of the suspension polymerization, acrylic acid is not wholly substituted for the methyl acrylate monomer in the foregoing process. Therefore, conventional manufacturing processes preferably utilize methyl acrylate, which is a relatively expensive monomer, in the syntheses of the ion exchange resin. Acrylic acid, however, can be copolymerized in a batch process with methyl acrylate monomer utilizing a divinylbenzene cross-linker.

The essentially total removal of ions from electrolyte-containing solutions is often accomplished using two ion exchange resins. In this process, deionization is performed by contacting an electrolyte-containing solution with two different types of ion exchange resins, i.e., an anion exchange resin and a cation exchange resin. The most common deionization procedure uses an acid resin (i.e., cation exchange) and a base resin (i.e., anion exchange). The two-step reaction for deionization is illustrated with respect to the desalinization of water as follows:

NaCl+R—SO$_3$H→R—SO$_3$Na+HCl

HCl+R—N(CH$_3$)$_3$OH→R—N(CH$_3$)$_3$Cl+H$_2$O.

The acid resin (R—SO$_3$H) removes the sodium ion; and the base resin (R—N(CH$_3$)$_3$OH) removes the chloride ions. This ion exchange reaction, therefore, produces water as sodium chloride is adsorbed onto the resins. The resins used in ion exchange do not absorb significant amounts of water.

The most efficient ion exchange occurs when strong acid and strong base resins are employed. However, weak acid and weak base resins also can be used to deionize saline solutions. The efficiency of various combinations of acid and base exchange resins are as follows:

Strong acid—strong base (most efficient)
Weak acid—strong base
Strong acid—weak base
Weak acid—weak base (least efficient).

The weak acid/weak base resin combination requires that a "mixed bed" configuration be used to obtain deionization. The strong acid/strong base resin combination does not necessarily require a mixed bed configuration to deionize water. Deionization also can be achieved by sequentially passing the electrolyte-containing solution through a strong acid resin and strong base resin.

A "mixed bed" configuration of the prior art is simply a physical mixture of an acid ion exchange resin and a base ion exchange resin in an ion exchange column, as disclosed in Battaerd U.S. Pat. No. 3,716,481. Other patents directed to ion exchange resins having one ion exchange resin imbedded in a second ion exchange resin are Hatch U.S. Pat. No. 3,957,698, Wade et al. U.S. Pat. No. 4,139,499, Eppinger et al. U.S. Pat. No. 4,229,545, and Pilkington U.S. Pat. No. 4,378,439. Composite ion exchange resins also are disclosed in Hatch U.S. Pat. Nos. 3,041,092 and 3,332,890, and Weiss U.S. Pat. No. 3,645,922.

The above patents are directed to resins that can be used to remove ions from aqueous fluids, and thereby provide purified water. Ion exchange resins used for water purification must not absorb large amounts of water because resin swelling resulting from absorption can lead to bursting of the ion exchange containment column.

Ion exchange resins having a composite particle containing acid and base ion exchange particles embedded together in a matrix resin, or having acid and base ion exchange particles adjacent to one another in a particle that is free of a matrix resin are disclosed in B. A. Bolto et al., *J. Polymer Sci.:Symposium No.* 55, John Wiley and Sons, Inc. (1976), pages 87–94.

In view of the foregoing, it would be desirable to provide a multicomponent ion exchange resin produced from less expensive monomers such as, for example, acrylic acid. Furthermore, it would be desirable to provide a multicomponent ion exchange resin that can be manufactured in a simple, continuous process, and that exhibits the excellent ion exchange properties and physical properties of prior ion exchange resins, or improves upon these properties. Additionally, it would be desirable to minimize the amount of organic solvents used in the preparation of an ion exchange resin.

SUMMARY OF THE INVENTION

The present invention is directed to multicomponent ion exchange resins comprising at least one crosslinked acidic resin, such as a polyacrylic acid, and at least one crosslinked basic resin, such as poly(vinylamine), a polyethyleneimine, or a poly(dialkylaminoalkyl acrylamide) or a poly (dialkylaminoalkyl methacrylamide), hereafter collectively referred to as poly(dialkylaminoalkyl (meth)acrylamides), and to methods of manufacturing the same. More particularly, the present invention is directed to multicomponent ion exchange resin granules containing at least one discrete microdomain of at least one acidic resin in contact with, or in close proximity to, at least one microdomain of at least one basic resin. The multicomponent ion exchange granules can contain a plurality of microdomains of the acidic resin and/or the basic resin dispersed throughout the particle. The acidic resin can be a strong or a weak acidic resin. Similarly, the basic resin can be a strong or a weak basic resin.

A preferred ion exchange granule contains one or more microdomains of at least one weak acidic resin and one or more microdomains of at least one weak basic resin. The properties demonstrated by such preferred multicomponent ion exchange granules are unexpected because, in ion exchange applications, the combination of a weak acid and a weak base is the least effective of any combination of a strong or weak acid ion exchange resin with a strong or weak basic ion exchange resin. The present ion exchange granules contain discrete microdomains of acidic and basic resin, and during hydration, the granules are nonswelling.

One aspect of the present invention, therefore, is to provide a multicomponent ion exchange resin comprising a dry granular product that preferably is internally crosslinked with a bulk and a latent crosslinking agent, and optionally is surface crosslinked.

The bulk crosslinking agent, which provides internal crosslinks between the acidic resin polymer chains or the basic resin polymer chains, has at least two polymerizable carbon-carbon double bonds. The latent crosslinking agent, which also provides internal crosslinks through the pendant acid or amino groups of a polymer includes (a) compounds having at least one polymerizable double bond and at least one functional group reactive with an acid or an amino group, (b) compounds having at least two functional groups reactive with acid or amino groups, (c) polyvalent metal compounds capable of forming ionic crosslinks with acid groups, and (d) mixtures thereof. The surface crosslinking agent typically is a diglycidyl ether, a polyhydroxy compound, a hydroxyalkylamide, an alkylene carbonate, or a mixture thereof.

Another aspect of the present invention is to provide a method, preferably a continuous method, of manufacturing a multicomponent ion exchange resin. The present multicomponent ion exchange granules are produced by any method that positions a microdomain of an acidic resin in contact with, or in close proximity to, a microdomain of a basic resin to provide a discrete particle. In one embodiment, the multicomponent ion exchange granules are produced by coextruding an acidic hydrogel and a basic hydrogel to provide granules having a plurality of discrete microdomains of an acidic resin and a basic resin dispersed throughout the particle. Such ion exchange granules absorb less than about 25 times, and preferably less than about 15 times, their weight in tap water under no load (i.e., AUNL), and resist swelling to a sufficient degree to perform as an ion exchange resin.

In another embodiment, the present multicomponent ion exchange granules can be prepared by admixing dry particles of a basic resin with a hydrogel of an acidic resin, then extruding the resulting mixture to form multicomponent ion exchange granules having microdomains of a basic resin dispersed throughout a continuous phase of an acidic resin. Alternatively, dry acidic resin particles can be admixed with a basic resin hydrogel, followed by extruding the resulting mixture to form multicomponent ion exchange granules having microdomains of an acidic resin dispersed in a continuous phase of a basic resin.

In addition, a multicomponent ion exchange granules containing microdomains of an acidic resin and a basic resin dispersed in a continuous phase of a matrix resin can be prepared by adding dry particles of the acidic resin and dry particles of the basic resin to a hydrogel of the matrix hydrogel, then extruding. Other forms of the present multicomponent ion exchange granules, such as agglomerated particles, interpenetrating polymer network forms, laminar forms, and concentric sphere forms, also demonstrate good ion exchange properties.

In accordance with yet another important aspect of the present invention, the acidic and basic resins are internally crosslinked, such as with a suitable bulk crosslinking agent and latent crosslinking agent. In preferred embodiments, the acidic resin, the basic resin, and/or the entire multicomponent ion exchange granules are surface treated or annealed to further improve ion exchange properties.

Yet another aspect of the present invention is to provide a method of manufacturing an acidic resin or a basic resin by polymerizing one or more monounsaturated acid or base monomer, or a salt thereof, and optional vinyl monomers, in the presence of about 0.01 to about 3 mole %, based on the total number of moles of the monomers, of a polyvinyl bulk crosslinking agent, to provide a bulk crosslinked polymer hydrogel, followed by the addition of about 0 to about 6 mole %, based on the total number of moles of the monomers, of a latent crosslinker to further crosslink the bulk crosslinked hydrogel, then heating the hydrogel-latent crosslinking agent mixture at a sufficient temperature for a sufficient time to dry and cure the hydrogel and to form crosslinks through pendant acid groups present on the polymer chains.

The multicomponent ion exchange granules can be surface crosslinked with 0 to about 2 weight % of a surface crosslinking agent, based on the weight of the granules. The step of surface crosslinking can be achieved by coating surfaces of the ion exchange granules with a solution containing a surface crosslinking agent, and then heating the coated granules at a sufficient temperature and for a sufficient time to dry the granules and provide surface crosslinks. A surface crosslinking agent often is required to provide the degree of crosslinking needed for an ion exchange resin.

A present multicomponent ion exchange resin preferably is in the form of irregular granules, as opposed to spheres. The granular form of the ion exchange resin provides a greater surface area than spheres, thereby providing a more efficient ion exchange. In some embodiments, the present ion exchange resin granules generally have a relatively "soft" interior, i.e., the degree of internal crosslinking (i.e., bulk plus latent crosslinking) is sufficient to resist granule swelling and to allow percolation of a liquid through the particles. The granules, however, typically have a relatively "hard" surface, i.e., the degree of surface of surface crosslinking is high, i.e., at least 1000 ppm, and preferably about 1000 to about 20,000 ppm, to impart structural integrity to the granules and to further prevent swelling of the granules during use.

An example of a weak acid resin is polyacrylic acid having 0% to 25% neutralized carboxylic acid groups (i.e., DN=0 to DN=25). Examples of weak basic resins are a poly(vinylamine), a polyethylenimine, and a poly (dialkylaminoalkyl (meth)acrylamide) prepared from a monomer either having the general structure formula (I)

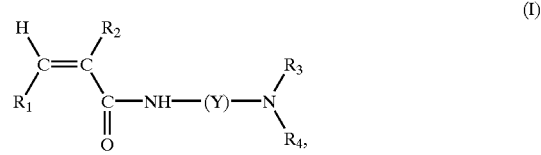

(I)

or the ester analog of (I) having the general structure formula (II)

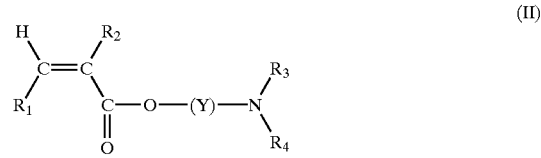

(II)

wherein $R_1$ and $R_2$, independently, are selected from the group consisting of hydrogen and methyl, Y is a divalent straight chain or branched organic radical having 1 to 8 carbon atoms, and $R_3$ and $R_4$, independently, are alkyl radicals having 1 to 4 carbon atoms. Examples of a strong basic water-absorbing resin are poly(vinylguanidine) and poly(allylguanidine).

Further aspects and advantages of the invention will become apparent from the following detailed description of the preferred embodiments of the invention, taken in conjunction with the examples and the appended claims.

BRIEF DESCRIPTION OF THE DRAWINGS

FIGS. 3A and 3B are schematic diagrams of a water-absorbing particle having a core microdomain of a first resin surrounded by a layer of a second resin;

FIGS. 5A and 5B are schematic diagrams of a water-absorbing particle having an interpenetrating network of a first resin and a second resin.

DETAILED DESCRIPTION OF THE PREFERRED EMBODIMENTS

The present invention is directed to multicomponent ion exchange granules containing at least one microdomain of an acidic resin in close proximity to, and preferably in contact with, at least one microdomain of a basic resin. Each granule contains one or more microdomains of an acidic resin and one or more microdomains of a basic resin. The microdomains can be distributed nonhomogeneously or homogeneously throughout each particle.

Each multicomponent ion exchange granule of the present invention contains at least one acidic resin and at least one basic resin. In one embodiment, the ion exchange granules consist essentially of acidic resins and basic resins, and contain microdomains of the acidic and/or basic resins. In another embodiment, microdomains of the acidic and basic resins are dispersed in an absorbent matrix resin.

The multicomponent ion exchange granules of the present invention are not limited to a particular structure or shape. However, it is important that substantially each ion exchange granules contain at least one microdomain of an acidic resin and at least one microdomain of a basic resin in close proximity to one another. Improved ion exchange properties are observed as long as the acidic resin microdomain and the basic resin microdomain are in close proximity within the granule. In a preferred embodiment, the microdomains of acidic and basic resin are in contact.

In some embodiments, an idealized multicomponent ion exchange granule of the present invention is analogous to a liquid emulsion wherein small droplets of a first liquid, i.e., the dispersed phase, are dispersed in a second liquid, i.e., the continuous phase. The first and second liquids are immiscible, and the first liquid, therefore, is homogeneously dispersed in the second liquid. The first liquid can be water or oil based, and conversely, the second liquid is oil or water based, respectively.

Figure 1:
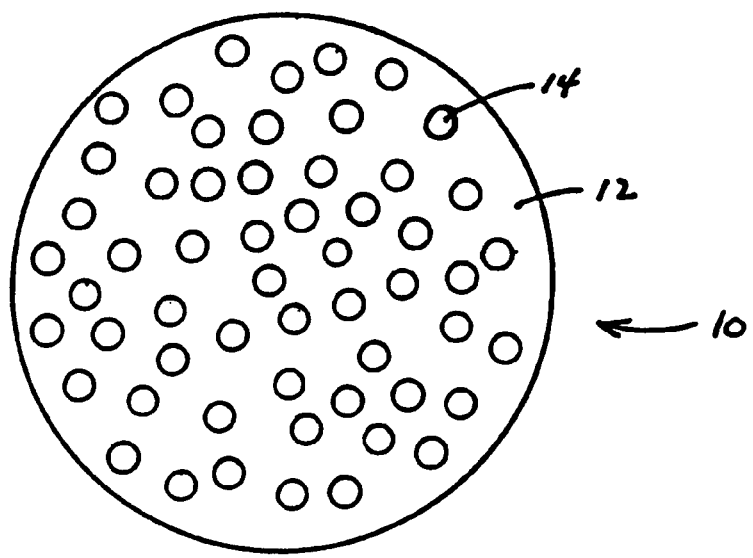
FIG. 1 is a schematic diagram of a water-absorbing particle containing microdomains of a first resin dispersed in a continuous phase of a second resin.

Therefore, in one embodiment, the multicomponent ion exchange granules of the present invention can be envisioned as one or more microdomains of an acidic resin dispersed in a continuous phase of a basic resin, or as one or more microdomains of a basic resin dispersed in a continuous acid resin. These idealized multicomponent ion exchange granules are illustrated in FIG. 1 showing a multicomponent ion exchange granule 10 having discrete microdomains 14 of a dispersed resin in a continuous phase of a second resin 12. If microdomains 14 comprise an acidic resin, then continuous phase 12 comprises a basic resin. Conversely, if microdomains 14 comprise a basic resin, then continuous phase 12 is an acidic resin.

Figure 2:
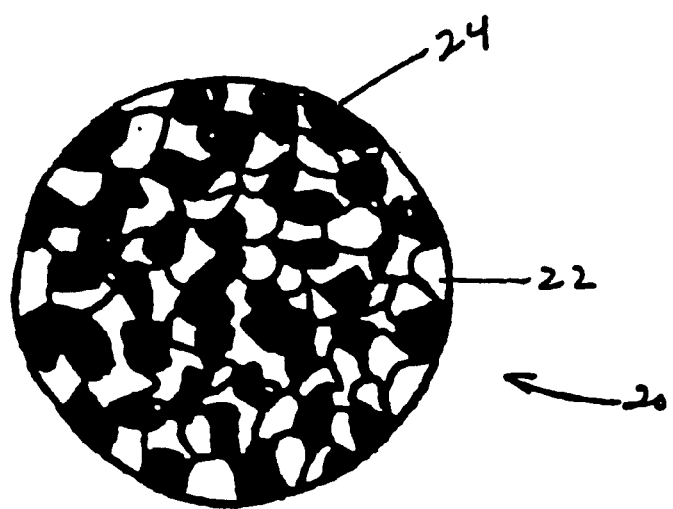
FIG. 2 is a schematic diagram of a water-absorbing particle containing microdomains of a first resin and microdomains of a second resin dispersed throughout the particle.

In another embodiment, the multicomponent ion exchange granules are envisioned as microdomains of an acidic resin and microdomains of a basic resin dispersed throughout each particle, without a continuous phase. This embodiment is illustrated in FIG. 2, showing an idealized multicomponent multicomponent ion exchange granule 20 having a plurality of microdomains of an acidic resin 22 and a plurality of microdomains of a basic resin 24 dispersed throughout particle 20.

In yet another embodiment, microdomains of the acidic and basic resins are dispersed throughout a continuous phase comprising a matrix resin. This embodiment also is illustrated in FIG. 1 wherein multicomponent ion exchange granule 10 contains one or more microdomains 14, each an acidic resin or a basic resin, dispersed in a continuous phase 12 of a matrix resin.

It should be understood that the microdomains within each particle can be of regular or irregular shape, and that the microdomains can be dispersed homogeneously or nonhomogeneously throughout each particle. Accordingly, another embodiment of the multicomponent ion exchange granules is illustrated in FIG. 3A, showing an idealized multicomponent particle 30 having a core 32 of an acidic resin surrounded by a shell 34 of a basic resin. Conversely, core 32 can comprise a basic resin, and shell 34 can comprise an acidic resin.

FIG. 3B illustrates a similar embodiment having a core and concentric shells that alternate between shells of acidic resin and basic resin. In one embodiment, core 42 and shell 46 comprise an acidic resin, and shell 44 comprises a basic resin. Other embodiments include: core 42 and shell 46 comprising a basic resin and shell 44 comprising an acidic resin, or core 42 comprising a matrix resin and shells 44 and 46 comprising an acidic resin and a basic resin in alternating shells. Other configurations are apparent to persons skilled in the art, such as increasing the number of shells around the core.

Figure 4A:
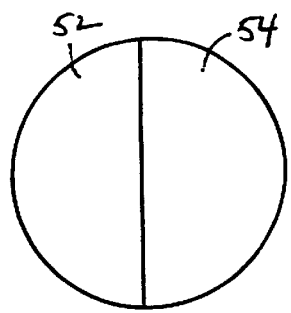
FIGS. 4A–D are schematic diagrams of water-absorbing particles having a microdomain of a first resin in contact with a microdomain of a second resin.
Figure 4B:
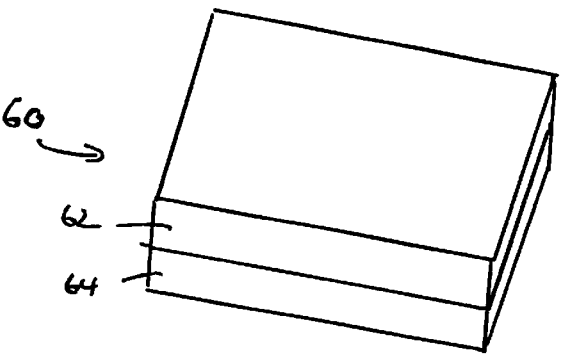
Figure 4C:
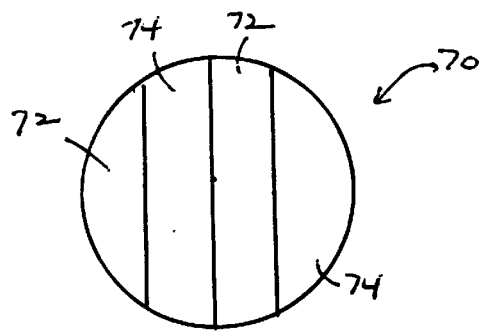
Figure 4D:
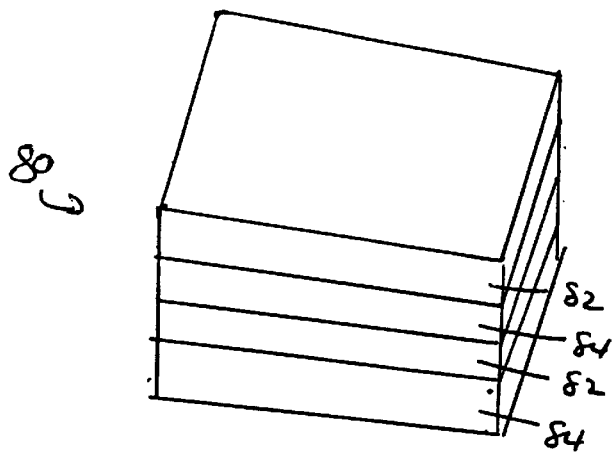

FIGS. 4A and 4B illustrate embodiments of the present multicomponent ion exchange granules wherein one microdomain of an acidic resin (i.e., 52 or 62) is in contact with one microdomain of a basic resin (i.e., 54 or 64) to provide a multicomponent ion exchange granule (i.e., 50 or 60). In these embodiments, the microdomains are dispersed nonhomogeneously throughout the particle. The embodiments illustrated in FIG. 4 extend to multicomponent ion exchange granules having more than one microdomain of each of the acidic resin and the basic resin, as illustrated in FIGS. 4C and 4D, wherein multicomponent ion exchange granules 70 and 80 contain alternating zones of acidic resin (e.g., 72 or 82) and basic resin (e.g., 74 or 84). Particles 70 and 80 also can contain one or more layers 72, 74, 82, or 84 comprising a matrix resin.

In another embodiment, the multicomponent ion exchange granule comprises an interpenetrating polymer network (IPN), as illustrated in FIG. 5. An IPN is a material containing two polymers, each in network form. In an IPN, two polymers are synthesized and/or crosslinked in the presence of one another, and polymerization can be sequential or simultaneous. Preparation of a sequential IPN begins with the synthesis of a first crosslinked polymer. Then, monomers comprising a second polymer, a crosslinker, and initiator are swollen into the first polymer, and polymerized and crosslinked in situ. For example, a crosslinked poly (acrylic acid) network can be infused with solution containing a poly(vinylamine) and a crosslinker.

Simultaneous IPNs are prepared using a solution containing monomers of both polymers and their respective crosslinkers, which then are polymerized simultaneously by noninterfering modes, such as stepwise or chain polymerizations. A third method of synthesizing IPNs utilizes two lattices of linear polymers, mixing and coagulating the lattices, and crosslinking the two components simultaneously. Persons skilled in the art are aware of other ways that an IPN can be prepared, each yielding a particular topology.

In most IPNs, the polymer phases separate to form distinct zones of the first polymer and distinct zones of the second polymer. In the remaining IPNs, the first and second polymers remain "soluble" in one another. Both forms of IPN have microdomains, and are multicomponent SAPs of the present invention.

FIGS. 5A and 5B illustrate IPN systems. FIG. 5A illustrates an IPN made by sequentially synthesizing the first and second polymers. FIG. 5B illustrates an IPN made by simultaneously polymerizing the first and second polymers. In FIGS. 5A and 5B, the solid lines represent the first polymer (e.g., the acidic polymer) and the lightly dotted lines represent the second polymer (e.g., the basic polymer). The heavy dots represent crosslinking sites.

In another embodiment, the multicomponent ion exchange granules are agglomerated particles prepared from fine particles of an acidic resin and fine particles of a basic resin. Typically, a fine resin particle has a diameter of less than about 200 microns ($\mu$), such as about 0.01 to about 180$\mu$. The agglomerated multicomponent ion exchange granules are similar in structure to the particle depicted in FIG. 2. With respect to the agglomerated ion exchange granules, it is important that the particles have sufficient dry agglomeration (i.e., in the dry state) and wet agglomeration (i.e., in the hydrogel state) to retain single particle properties, i.e., the particles do not disintegrate into their constituent fine particles of acidic resin and basic resin.

In particular, the agglomerated particles have sufficient dry agglomeration to withstand fracturing. The dry agglomerated particles typically have an elastic character and, therefore, are not friable. The agglomerated particles also have sufficient wet strength to exhibit a property termed "wet agglomeration." Wet agglomeration is defined as the ability of an agglomerated multicomponent ion exchange granule to retain its single particle nature upon hydration, i.e., a lack of deagglomeration upon hydration. Wet agglomeration is determined by positioning fifty agglomerated ion exchange granule on a watch glass and hydrating the particles with 20 times their weight of a 1% (by weight) sodium chloride solution (i.e., 1% saline). The granules are spaced sufficiently apart such that they do not contact one another after hydration. The ion exchange granule are allowed to absorb the saline solution for one hour, then the number of ion exchange granule is recounted under a microscope. The multicomponent ion exchange granule pass the wet agglomeration test if no more than about 53 hydrated particles are counted.

The multicomponent ion exchange granules of the present invention comprise an acidic resin and a basic resin in a weight ratio of about 90:10 to about 10:90, and preferably about 20:80 to about 80:20. To achieve the full advantage of the present invention, the weight ratio of acidic resin to basic resin in a multicomponent ion exchange granules is about 30:70 to about 70:30. The acidic and basic resins can be distributed homogeneously or nonhomogeneously throughout the ion exchange granule.

The acidic resin and basic resin contain latent and/or surface crosslinks in addition to bulk crosslinks. A latent crosslinking agent can be present in the monomer mixture or can be added to a hydrogel. The hydrogel, and latent crosslinker, if present, then is dried, cured, and sized to form dried granules containing bulk and, optionally, latent crosslinks. In some cases, the surfaces of the acidic resin and basic resin are surface crosslinked with at least about 1000 ppm of surface crosslinking agent. Surface crosslinking can be omitted if a latent crosslinking agent is used to provide latent crosslinks. Preferred embodiments of the present multicomponent ion exchange resin incorporate a latent crosslinking agent and a surface crosslinking agent in the acidic and/or basic resin.

In one embodiment, a latent crosslinking agent is added to the monomer mixture. The latent crosslinking agent is not involved in the bulk polymerization reaction, but is dispersed in the polymer hydrogel. In another embodiment, the latent crosslinking agent is added to, and homogeneously dispersed in, the polymer hydrogel after the bulk polymerization reaction.

In either embodiment, heating the hydrogel, in the presence of the latent crosslinking agent, for a sufficient time at a sufficient temperature, forms latent crosslinks by reacting with pendant acid or amino groups present on the polymer chains. After latent crosslinking, the resulting acidic resin or basic resin particles optionally can be surface crosslinked. Surface crosslinking can be accomplished, for example, by coating surfaces of the acidic or basic resin with the surface crosslinking agent, and then heating the coated granules at a sufficient temperature for a sufficient time to result in a dry acidic or basic resin.

The bulk crosslinking agent comprises a compound having at least two polymerizable carbon-carbon double bonds and is incorporated into the polymer chains. A latent crosslinking agent comprises (a) a compound having at least one polymerizable double bond and at least one functional group reactive with an acid or an amino group, (b) a compound having at least two functional groups reactive with an acid group or an amino group, (c) a polyvalent metal compound capable of forming ionic crosslinks with an acid group, and (d) mixtures thereof. The latent crosslinking agent crosslinks polymer chains through the pendant acid or amino groups. The surface crosslinking agent typically is a difunctional compound, like a diglycidyl ether, glycerol, a glycol or polyol, a hydroxyalkylamide, an alkylene carbonate, or a mixture thereof.

Multicomponent ion exchange granules of the present invention have a sufficient degree of internal crosslinking, and of surface crosslinking, to resist appreciable swelling in the presence of aqueous media. Preferred ion exchange resin granules of the present invention have a relatively low degree of bulk crosslinking. This is in contrast to present day ion exchange resins that rely upon a high degree of bulk crosslinking to impart structural integrity to the ion exchange particle and to limit swelling of the ion exchange particle during hydration. This function is performed by the latent and surface crosslinking agents present in the multicomponent ion exchange granules of the present invention. The present multicomponent ion exchange granules are similar in chemical identity to superabsorbent polymers, but have a sufficiently high degree of internal and surface crosslinking such that the present ion exchange resins cannot absorb large amounts of fluids, and do not swell like a typical superabsorbent polymer.

Superabsorbent polymers (SAPs) are discussed generally in Goldman et al. U.S. Pat. Nos. 5,669,894 and 5,559,335. Multicomponent SAP resins are disclosed in WO 99/25393. As used herein, the term "SAP" refers to superabsorbent polymer particles in the dry state, more specifically, particles containing from no water up to an amount of water less than the weight of the particles. SAPs can differ in their chemical identity, but all SAPs are capable of absorbing and retaining amounts of aqueous fluids equivalent to many times (i.e., at least 10 and up to a hundred times) their own weight, even under moderate pressure. The ability to absorb aqueous fluids under a confining pressure and form a hydrogel is an important requirement for an SAP. The term "hydrogel" refers to polymer particles in the hydrated state, and more specifically, to particles that have absorbed at least their weight in water, and typically several times their weight in water. This property is important because an SAP is used in, for example, sanitary and hygienic articles, wiping cloths, water-retaining agents, dehydrating agents, disposable towels and bath mats, disposable door mats, and disposable litter mats for pets. The ability to retain several times its weight in water, and thereby swell to form a hydrogel, is not desirable for an ion exchange resin, and is avoided because excessive swelling of an ion exchange resin retards or prohibits flow of a fluid through a bed of ion exchange resin granules.

The present multicomponent ion exchange granules contain at least about 50%, and preferably at least about 70%, by weight of acidic resin plus basic resin. To achieve the full advantage of the present invention, a multicomponent ion exchange granule contains about 80% to 100% by weight of the acidic resin plus basic resin. Components of the present ion exchange granules, other than the acidic and basic resin, typically, are matrix resins or other minor optional ingredients.

The multicomponent ion exchange granules of the present invention can be in any form, either regular or irregular, such as granules, fibers, beads, flakes, or any other desired shape useful in ion exchange applications. In embodiments wherein the multicomponent ion exchange granule is prepared using an extrusion step, the shape of the granule is determined by the shape of the extrusion die. The shape of the multicomponent ion exchange granules also can be determined by other physical operations, such as milling or by the method of preparing the particles, such as agglomeration.

In one preferred embodiment, the present ion exchange granules are in the form of a granule or a bead, having a particle size of about 1 to about 10,000 microns ($\mu$m), and preferably about 100 to about 2500 $\mu$m. To achieve the full advantage of the present invention, the multicomponent ion exchange granules have a particle size of about 150 to about 2000 $\mu$m, and a median particle diameter of about 300 to about 1000 $\mu$m.

A microdomain is defined as a volume of an acidic resin or a basic resin that is present in a multicomponent ion exchange granule. Because each multicomponent ion exchange granule contains at least one microdomain of an acidic resin, and at least one microdomain of a basic resin, a microdomain has a volume that is less than the volume of the multicomponent ion exchange granule. A microdomain, therefore, can be as large as about 90% of the volume of a multicomponent ion exchange granule.

Typically, a microdomain has a diameter of about 750 $\mu$m or less, and preferably about 100 $\mu$m or less. To achieve the full advantage of the present invention, a microdomain has a diameter of about 20 $\mu$m or less. The multicomponent ion exchange granules also contain microdomains that have submicron diameters, e.g., microdomain diameters of less than 1 $\mu$m, preferably less than 0.1 $\mu$m, to about 0.01 $\mu$m.

In another preferred embodiment, the multicomponent ion exchange granules are in the shape of a fiber, i.e., an elongated, acicular ion exchange granule. The fiber can be in the shape of a cylinder, for example, having a minor dimension (i.e., diameter) and a major dimension (i.e., length). The fiber also can be in the form of a long filament that can be woven. Such filament-like fibers have a weight of below about 80 decitex, and preferably below about 70 decitex, per filament, for example, about 2 to about 60 decitex per filament. Tex is the weight in grams per one kilometer of fiber. One tex equals 10 decitex. For comparison, poly(acrylic acid) is about 4 decitex, and poly(vinylamine) is about 80 decitex.

Cylindrical multicomponent ion exchange granules have a minor dimension (i.e., diameter of the fiber) less than about 1 mm, usually less than about 500 $\mu$m, and preferably less than 250 $\mu$m, down to about 50 $\mu$m. The cylindrical ion exchange fibers can have a relatively short major dimension, for example, about 1 mm, e.g., in a fibrid, lamella, or flake-shaped article, but generally the fiber has a length of about 3 to about 100 mm. The filament-like fibers have a ratio of major dimension to minor dimension of at least 500 to 1, and preferably at least 1000 to 1, for example, up to and greater than 10,000 to 1.

Each multicomponent ion exchange granule contains one or more microdomains of an acidic resin and one or more microdomains of a basic resin, either in contact or in close proximity to one another. In accordance with an important feature of the present invention, the present multicomponent ion exchange granules demonstrate good permeability, both through an individual particle and between particles.

A single multicomponent ion exchange granule simultaneously desalinates an electrolyte-containing liquid. Desalination is essentially independent of particle size. Accordingly, the present multicomponent ion exchange granules can be of a relatively large size. These features allow for improved liquid permeability through and between the ion exchange granules, and results in a more rapid desalination of the electrolyte-containing liquid.

The following schematic reactions illustrate the reactions which occur to deionize, e.g., desalinate, an aqueous saline solution, and that are performed essentially simultaneously in a single multicomponent ion exchange granule:

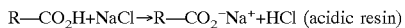
$R-CO_2H + NaCl \rightarrow R-CO_2^- Na^+ + HCl$ (acidic resin)

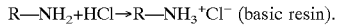
$R-NH_2 + HCl \rightarrow R-NH_3^+ Cl^-$ (basic resin).

The present multicomponent ion exchange granules can be in a form wherein a microdomain of an acidic resin is in contact with a microdomain of a basic resin. In another embodiment, the multicomponent ion exchange granule can be in a form wherein at least one microdomain of an acidic resin is dispersed in a continuous phase of a basic resin. Alternatively, the multicomponent ion exchange granule can be in a form wherein at least one microdomain of a basic resin is dispersed in a continuous phase of an acidic resin. In another embodiment, at least one microdomain of one or more acidic resin and at least one microdomain of one or more basic resin comprise the entire ion exchange granule, and neither type of resin is considered the dispersed or the continuous phase. In yet another embodiment, at least one microdomain of an acidic resin and at least one microdomain of a basic resin are dispersed in a matrix resin.

An acidic resin present in a multicomponent ion exchange granule can be either a strong or a weak acidic water-absorbing resin. The acidic resin can be a single resin, or a mixture of resins. The acidic resin typically is present in its acidic form, i.e., about 75% to 100% of the acidic moieties are present in the free acid form. However, effective ion exchange granules are provided when less than 75% of the acidic moieties are present in the free acid form.

The acidic resin is subjected to further crosslinking utilizing a latent crosslinking agent and/or a surface crosslinking agent. As used herein, a "latent crosslinking agent" is a compound having functionality capable of reacting with the pendant acid groups present on the polymerization reaction product. The latent crosslinking agent is added to the monomer mixture or to the acidic resin hydrogel, and forms internal crosslinks throughout the granule (by reaction with the pendant carboxylic acid groups) when the hydrogel is dried to form the ion exchange granules.

As used herein, a "surface crosslinking agent" also is a compound having functionality capable of reacting with pendant acid groups. The "surface crosslinking agent" is applied to the surface of the ion exchange granules, and is reacted to form additional crosslinks at the surfaces of the ion exchange granules.

The acidic resin and basic resin typically are prepared by polymerizing a monomer containing an acyl or other acid moiety, e.g., acrylic acid or a salt thereof, a monomer containing an amino group, or a moiety capable of providing an acid or amino group, i.e., acrylonitrile or N-vinylformamide, in the presence of a bulk crosslinking agent. The term "bulk crosslinking agent" is defined as a polyvinyl monomer capable of copolymerizing with another monomer via reaction of unsaturated carbon-carbon bonds. The acidic resin and basic resin can contain other copolymerizable units, i.e., other monoethylenically unsaturated comonomers, well known in the art (like styrene), as long as the polymer is substantially, i.e., at least 10%, and preferably at least 50%, acid or base monomer units. To achieve the full advantage of the present invention, the acidic or basic resin contains at least 75%, and more preferably, at least 85%, and up to 100%, acid or base monomer units. The acidic resin and basic resin can be neutralized from 0 to 100 mole % with a base or an acid, like sodium hydroxide, to provide a neutralized acidic resin or basic resin.

The acidic resins have pendant carboxyl groups present along the polymer chain. Polymers containing such pendant carboxyl groups are synthesized either from monomers previously substituted with one or more acid groups or by incorporating acid groups into the polymer after synthesis. To incorporate carboxyl groups into a polymer, any of a number of ethylenically unsaturated acids can be homopolymerized or copolymerized. Carboxyl groups also can be incorporated into the polymer chain indirectly by hydrolyzing homopolymers and copolymers of monomers such as acrylamide, acrylonitrile, methacrylamide, and alkyl(meth) acrylates.

Therefore, the acidic resins are not limited to resins based on acrylic acid, but extends to acidic resins that include, but are not limited to, methacrylic acid, ethacrylic acid, α-chloroacrylic acid, α-cyanoacrylic acid, β-methacrylic acid (crotonic acid), 2-methyl-2-butene dicarboxylic acid, α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitric acid, maleic acid, fumaric acid, tricarboxyethylene, maleic anhydride, fumaric anhydride, itaconic anhydride, citraconic anhydride, mesaconic anhydride, methyl itaconic anhydride, ethyl maleic anhydride, diethyl maleate, methyl maleate, and other α,β-unsaturated carboxylic acids and anhydrides, salts thereof, partial salts thereof, and mixtures thereof. Acrylic acid, however, is the most preferred α,β-unsaturated carboxylic acid.

In addition, the acidic resin can be a polymer prepared from a monomer containing a sulfonate, sulfate, phosphonate, or phosphate group as the acid group. Sulfonate groups can be generated from monomers containing functional groups hydrolyzable to the sulfonic acid form, for example, alkenyl sulfonic acid compounds and sulfoalkylacrylate compounds. Ethylenically unsaturated sulfonic acid monomers include, for example, aliphatic or aromatic vinyl sulfonic acids, such as vinylsulfonic acid, allyl sulfonic acid, vinyl toluene sulfonic acid, styrene sulfonic acid, acrylic and methacrylic sulfonic acids, such as sulfoethyl acrylate, sulfoethyl methacrylate, sulfopropyl acrylate, 2-vinyl-4-ethyl-benzene, 2-allylbenzene sulfonic acid, 1-phenyl-ethylene sulfonic acid, sulfopropyl methacrylate, 2-hydroxy-3-methacryloxypropyl sulfonic acid, and 2-acrylamide-2-methylpropane sulfonic acid.

Sulfate groups are generated by reacting homopolymers or copolymers containing hydroxyl groups or residual ethylenic unsaturation with sulfuric acid or sulfur trioxide. Examples of such treated polymers include sulfated polyvinyl alcohol, sulfated hydroxyethyl acrylate, and sulfated hydroxypropyl methacrylate. Phosphate groups are incorporated by copolymerizing ethylenically unsaturated monomers containing a phosphoric acid moiety, such as methyacryloxy ethyl phosphate, with the α,β-unsaturated carboxylic acid.

The acidic resin, therefore, can be based on, for example, polyacrylic acid, hydrolyzed starch-acrylonitrile graft copolymers, starch-acrylic acid graft copolymers, saponified vinyl acetate-acrylic ester copolymers, hydrolyzed acrylonitrile copolymers, hydrolyzed acrylamide copolymers, ethylene-maleic anhydride copolymers, isobutylene-maleic anhydride copolymers, poly(vinylsulfonic acid), poly (vinylphosphonic acid), poly(lactic acid), and mixtures thereof. The preferred acidic resins are the polyacrylic acids.

Optional copolymerizable vinyl monomers for introduction into the acidic resin include, but are not limited to, ethylene, propylene, isobutylene, $C_1$ to $C_4$ alkyl acrylates and methacrylates, vinyl acetate, methyl vinyl ether, and styrenic compounds having the formula:

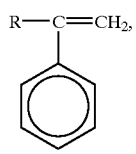

wherein R represents hydrogen or a $C_{1-6}$ alkyl group, and wherein the phenyl ring optionally is substituted with one to four $C_{1-4}$ alkyl or hydroxy groups. Such vinyl monomers are present in an amount of 0 to 50%, by weight, of the monomers present in the polymerizable monomer mixture.

Suitable $C_1$ to $C_4$ alkyl acrylates include, but are not limited to, methyl acrylate, ethyl acrylate, isopropyl acrylate, n-propyl acrylate, n-butyl acrylate, and the like, and mixtures thereof. Suitable $C_1$ to $C_4$ alkyl methacrylates include, but are not limited to, methyl methacrylate, ethyl methacrylate, isopropyl methacrylate, n-propylmethylmethacrylate, n-butyl methacrylate, and the like, and mixtures thereof or with $C_{1-4}$ alkyl acrylates. Suitable styrenic compounds include, but are not limited to, styrene, α-methylstyrene, p-methylstyrene, t-butyl styrene, and the like, and mixtures thereof or with $C_{1-4}$ alkyl acrylates and/or methacrylates.

The acrylic acid, or other α,β-unsaturated acids, and optional vinyl monomers, are polymerized in the presence of a polyfunctional bulk crosslinking agent, preferably by standard free radical techniques. While aqueous solution polymerization, as described herein, is the preferred method of manufacturing an acidic resin, other polymerization methods also can be used. Such methods include inverse emulsion polymerization and inverse suspension polymerization processes generally described in Obayashi et al. U.S. Pat. No. 4,340,706 and Flesher U.S. Pat. No. 4,506,062, the disclosures of which are hereby incorporated herein by reference. When inverse phase processes, or any other process employing organic solvent are used, the polymer recovered from such processes is treated to remove substantially all of the excess solvent.

Typically, the acrylic acid or amino-containing monomer, or salt thereof, and any optional vinyl comonomers are present in the aqueous monomer mixture in an amount of at least about 25 wt. % to about 95 wt. %, based on the weight of the aqueous mixture. The bulk crosslinking agent is present in an amount of about 0.01 to about 3 mole % of bulk crosslinking agent per mole of monomers, and more preferably about 0.02 to about 2 mole % of bulk crosslinking agent per mole of monomers. Alternatively stated, a bulk crosslinking agent is present in the monomer mixture in an amount of less than about 7 wt. %, and typically about 0.1 to about 5 wt. %, based on the total weight of the monomers. Preferably, the bulk crosslinker is present in the monomer mixture in an amount of about 0.2 to about 3 wt. %, based on the total weight of the monomers.

The α,β-unsaturated acid monomer is bulk crosslinked during aqueous solution polymerization to a sufficient extent such that the resulting polymer is substantially water-insoluble, i.e., less than 3% by weight water soluble, but has an ability to absorb several times its weight in water. The reaction product also is sufficiently crosslinked during polymerization to perform as an ion exchange resin because the polymerization reaction product resists swelling after hydration. Such properties are desirable in ion exchange resins. The polymerization reaction product, therefore, has a crosslinking density of less than about 20%, typically less than about 15%, and often about 0.01% to about 10%.

Bulk crosslinking agents include compounds having at least two polymerizable carbon-carbon double bonds. Examples of bulk crosslinking agents are crosslinking polyvinyl monomers that include polyacrylic (or polymethacrylic) acid esters represented by the following formula (III); and bisacrylamides, represented by the following formula (IV).

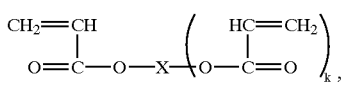

(III)

wherein X is ethylene, propylene, trimethylene, cyclohexyl, hexamethylene, 2-hydroxypropylene, —(CH$_2$CH$_2$O)$_n$CH$_2$CH$_2$—, or

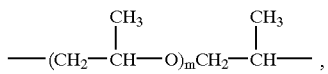

wherein n and m, independently, are an integer 5 to 40, and k is 1 or 2;

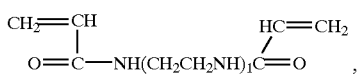

(IV)

wherein 1 is 2 or 3.

The compounds of formula (I) are prepared by reacting polyols, such as ethylene glycol, propylene glycol, trimethylolpropane, 1,6-hexanediol, glycerin, pentaerythritol, polyethylene glycol, or polypropylene glycol, with acrylic acid or methacrylic acid. The compounds of formula (II) are obtained by reacting polyalkylene polyamines, such as diethylenetriamine, tris(2-aminoethyl) amine, 1,3-diaminopropane, hexamethylenediamine, ethylenediamine, and triethylenetetramine, with acrylic acid.

Specific crosslinking monomers include, but are not limited to, 1,3-butylene glycol diacrylate, 1,3-butylene glycol dimethacrylate, 1,4-butanediol dimethacrylate, 1,4-butanediol diacrylate, 1,6-hexanediol dimethacrylate, 1,6-hexanediol diacrylate, cyclopentadiene diacrylate, diallyl succinate, diallyl maleate, diallyl esters of a polycarboxylic acid, diallyl fumarate, diethylene glycol diacrylate, diethylene glycol dimethacrylate, dipentaerythritol pentaacrylate, divinyl ethers of ethylene glycol, divinyl esters of a polycarboxylic acid, divinyl ether divinyl adipate, divinylbenzene, ethoxylated bisphenol-A dimethacrylate, ethoxylated bisphenol-A diacrylate, ethylene glycol diacrylate, ethylene glycol dimethacrylate, ethylene glycol digylcidyl ether (EGDGE), N,N'-methylenebisacryl-amide (MBA), neopentyl glycol dimethacrylate, pentaerythritol triacrylate, pentaerythritol tetraacrylate, polyethylene glycol diacrylate, polyethylene glycol dimethacrylate, tetraallyl ammonium halides, tetraallyloxyethanetetraethylene glycol diacrylate, tetraethylene glycol dimethacrylate, triallylamine (TAA), triallyl terephthalate, triallyl pentaerythritol ether (TAPE), triethylene glycol dimethacrylate, triethylene glycol diacrylate, trimethylolpropane triacrylate (TMPTA), trimethylolpropane trimethacrylate, tripropylene glycol diacrylate, tris(2-hydroxyethyl)isocyanurate triacrylate, tris (2-hydroxyethyl)isocyanurate trimethacrylate, trivinyl trimellitate, and mixtures thereof. Compounds such as divinylbenzene and divinyl ether also can be used as crosslinkers. Especially preferred bulk crosslinking agents are N,N'-methylenebisacrylamide, N,N'-methylenebismethacrylamide, ethylene glycol dimethacrylate, and trimethylolpropane triacrylate.

Optionally, the acidic resin hydrogel can be further crosslinked by a latent crosslinking agent. In particular, in some cases, it is desirable to provide a polymerized reaction product (i.e., the acidic resin hydrogel) having a low crosslink density. Such hydrogels are easy to handle, for example, are easily extruded. However, the water-insoluble polymer present in the hydrogel does not contain a sufficient crosslink density to provide polymer granules useful as an ion exchange resin. For example, granules resulting from the lightly crosslinked polymerized reaction product would absorb many times their weight in water and would swell. Such granules could not be used as an ion exchange resin because aqueous fluids would not be able to efficiently flow through a bed of water-absorbing, swelling granules.

Therefore, in accordance with one embodiment of the present invention, a lightly crosslinked polymer reaction product is prepared to take advantage of the excellent handling properties of the lightly crosslinked polymer. The lightly crosslinked polymer then is further crosslinked using a latent crosslinking agent to crosslink polymer chains through pendant acid groups present on the polymer chains. After latent crosslinking occurs, the resulting polymer has sufficient crosslinks to provide granules that do not absorb large quantities of aqueous fluids and that do not swell appreciably. The granules, therefore, can be used in ion exchange applications.

The latent crosslinking agent can be added to the monomer mixture prior to the polymerization reaction. During polymerization, the reaction conditions are such that the latent crosslinking agent does not react to an appreciable degree with the pendant acid groups on the polymer. After polymerization, the resulting polymer typically is a hydrogel comprising the polymer and solvent, typically water, and, if present, the latent crosslinking agent. Then, during a subsequent heating or drying step to remove the solvent from the hydrogel, and form ion exchange granules, the latent crosslinking agent reacts with pendant groups on the polymer chain to further crosslink the polymer. Alternatively, the latent crosslinking agent can be added to the polymer hydrogel after polymerization to provide additional polymer crosslinks in a subsequent heating step.

The latent crosslinking agent is added to the monomer mixture, or to the polymer hydrogel, in an amount of 0 to about 6, preferably about 0.1 to about 5, mole %, based on the moles of the monomers present in the monomer mixture. To achieve the full advantage of the present invention, the latent crosslinking agent is present in an amount of about 0.2 to about 5 mole %, based on the moles of the monomers present in the monomer mixture.

The latent crosslinking agent can be any compound having two functional groups capable of reacting with pendant acid groups on the polymer. Additional latent crosslinking agents are compounds having at least one polymerizable double bond and at least one functional group reactive with acid groups. Such compounds are incorporated into the polymer chain during the polymerization reaction, and in subsequent processing steps form latent crosslinks. Another class of latent crosslinking agents are polyvalent metal ions capable of forming ionic crosslinks with acid groups.

The latent crosslinking agent typically is a water-soluble compound, and is present in the polymer hydrogel, added either prior to or after polymerization, either neat or as a water and/or alcohol solution. Then, when heating the polymer hydrogel at a temperature of about 50° C. to about 200° C., and preferably about 75° C. to about 180° C., for a sufficient time to dry and cure the hydrogel, the latent crosslinking agent reacts with pendant groups on the lightly crosslinked polymer to form additional crosslinks between polymer chains. To achieve the full advantage of the present invention, the polymer hydrogel is dried in the presence of a latent crosslinking agent at a temperature of about 90° C. to about 160° C. The polymer hydrogel is heated for about 30 minutes to about 4 hours, and preferably about 30 minutes to about 3 hours. To achieve the full advantage of the present invention, the polymer hydrogel is heated for about 30 minutes to about 150 minutes to form latent crosslinks.

The identity of the latent crosslinking agent is not limited, as long as the latent crosslinking agent has at least one functional group capable of reacting with pendant acid groups on the polymer at a temperature of about 50° C. to about 200° C. over a time period of about 30 minutes to about 4 hours. Preferably, the latent crosslinking agent is alcohol soluble or water soluble, and possesses sufficient reactivity with polymer such that crosslinking occurs in a controlled fashion, preferably at a temperature of about 50° C. to about 200° C.

Nonlimiting examples of suitable latent crosslinking agents for the polymerized reaction product of a crosslinked acrylic acid and α,β-unsaturated acids include:

(a) polyhydroxy compounds, such as glycols, triols, and polyols, like ethylene glycol, propylene glycol, 1,3-butylene glycol, and glycerol, for example;
(b) polyvalent metal salts;
(c) quaternary ammonium compounds;
(d) multifunctional epoxy compounds, such as ethylene glycol diglycidyl ether, for example;
(e) alkylene carbonates, such as ethylene carbonate or propylene carbonate, for example;
(f) polyaziridines, such as 2,2-bishydroxymethyl butanol tris[3-(1-aziridine propionate]), for example;
(g) a haloepoxy, such as epichlorhydrin;
(h) a polyamine, such as ethylenediamine, diethylenetriamine, 1,3-diaminopropane, 1,6-diaminohexane, triethylenetetraamine, tris(2-aminoethyl)amine, 1,4-diaminobutane, and 1,5-diaminopentane;
(i) a polyisocyanate, such as 2,4-toluene diisocyanate;
(j) a hydroxyalkylamide as disclosed in Swift et al. U.S. Pat. No. 4,076,917, incorporated herein by reference, such as bis[N,N-di(β-hydroxyethyl)]adipamide, bis[N,N-di(β-hydroxypropyl)]succinamide, bis[N,N-di(β-hydroxyethyl)]azelamide, bis[N,N-di(β-hydroxypropyl)]adipamide, and bis[N-methyl-N-(β-hydroxyethyl)]oxamide, for example. A commercially available HAA is PRIMID™ XL-552 from EMS-CHEMIE, Dornat, Switzerland, having the structure

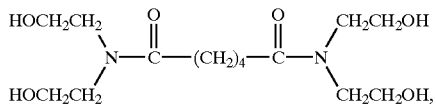

and another commercially available HAA is PRIMID™ QM-1260 having the structure

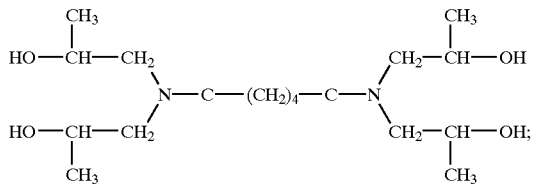

(k) hydroxyalkyl acrylates, hydroxyalkyl methacrylates, aminoalkyl acrylates, and aminoalkyl methacrylates; and
(l) other crosslinking agents having at least two functional groups capable of reacting with pendant acid groups on a polymer, as known to persons skilled in the art.

Examples of latent crosslinking agents for the acidic resin include, but are not limited to, a glycol, a triol, a polyol, ethylene glycol, propylene glycol, 1,3-butylene glycol, glycerol, ethylene glycol diglycidyl ether, ethylene carbonate, propylene carbonate, 2,2-bishydroxymethyl butanol tris[3-(1-aziridine propionate]), epichlorohydrin, ethylenediamine, diethylenetriamine, tris(2-aminoethyl) amine, 1,3-diaminopropane, 1,6-diaminohexane, triethylenetetraamine, 1,4-diaminobutane, 1,5-diaminopentane, 2,4-toluene diisocyanate, bis[N,N-di(β-hydroxyethyl)]adipamide, bis[N,N-di(β-hydroxypropyl)]succinamide, bis[N,N-di(β-hydroxyethyl)]azelamide, bis[N,N-di(β-hydroxypropyl)]adipamide, bis[N-methyl-N-(β-hydroxyethyl)]oxamide, hydroxyethyl acrylate, hydroxypropyl methacrylate, aminoethyl acrylate, aminopropyl methacrylate, and mixtures thereof.

Preferred latent crosslinking agents include a multifunctional epoxy compound, an alkylene carbonate, a hydroxyalkylamide, a polyhydroxy compound, a polyamine, or a mixture thereof. Especially preferred latent crosslinking agents are a glycol, ethylene glycol diglycidyl ether, propylene carbonate, propylene glycol, ethylenediamine, and bis{N,N-di(β-hydroxypropyl)]adipamide.

Polymerization of the aqueous monomer mixture is achieved by bringing the mixture to a temperature of about –10° C. to about 100° C., preferably about 50° C. to about 80° C., and adding a polymerization initiator. The initiator can be a redox initiator, a thermal initiator, or a mixture thereof.

Examples of redox initiators include a reducing agent, such as a sulfite or bisulfite of an alkali metal, ammonium sulfite, ammonium metabisulfate, or ammonium bisulfite; an alkali metal persulfate or ammonium persulfate; t-butyl hydroperoxide; di-t-butyl hydroperoxide; t-butyl perbenzoate; t-butyl peroxy isopropyl carbonate; and peroxy-3,3,5 trimethylcyclohexane. Examples of suitable thermal initiators include azobisisobutyronitrile; 4-t-butylazo-4'-cyanovaleric acid; 4,4'-azobis(4-cyanovaleric acid); 2,2'-azobis(2-amidinopropane)dihydrochloride; 2,2'-azobis(2,4-dimethylvaleronitrile); dimethyl 2,2'-azobisisobutyrate; 2,2'-azodimethyl bis(2,4-dimethylvaleronitrile); (1-phenylethyl)azodiphenylmethane; 2,2'-azobis(2-methylbutyronitrile); 1,1'-azobis(1-cyclohexanecarbonitrile); 2-(carbamoylazo)-isobutyronitrile; 2,2'-azobis(2,4,4-trimethylpenta-2-phenylazo-2,4-dimethyl-4-methoxyvaleronitrile; 2,2'-azobis(2-methylpropane); 2,2'-azobis(N,N'-dimethyleneisobutyramidine)dihydrochloride; 4,4'azobis(4-cyanopentanoic acid); 2,2'-azobis(2-methyl-N-[1,1-bis(hydroxymethyl)-2-hydroxyethyl]propionamide); 2,2'-azobis(2-methyl-N-[1,1-bis(hydroxymethyl)ethyl] propionamide); 2,2'-azobis[2-methyl-N(2-hydroxyethyl) propionamide]; 2,2'-azobis(isobutyramide)dihydrate, and the like.

These initiators, redox and thermal, can be used singly or in combination. Of these, especially preferred initiators are a redox initiator comprising ammonium persulfate and sodium hydrogen sulfite, and azo initiators, such as azobisisobutyronitrile or 2,2'-azobis(2-amidinopropane) dihydrochloride, commercially available under the tradename V-50 from Wako Chemicals U.S.A., Inc., Richmond, Va. The initiator is used in the form of an aqueous solution, but the initiator can be diluted with another suitable solvent. The initiator typically is used, for example, in an amount, calculated as solids, of about 0.1 wt. % to about 10 wt. %, based on the weight of the acrylic acid monomer, preferably about 0.5 wt. % to about 5 wt. %, based on the weight of the monomers. Depending on the amount and kind of the initiator, the initiator optionally can be used together with isopropyl alcohol, an alkyl mercaptan, or other chain transfer agent to control the molecular weight of the polymerization product.

Ultraviolet (UV) light also can be used to effect polymerization of the monomer mixture. UV light is used in conjunction with a redox initiator and/or a free radical initiator. In addition, when UV light is utilized, a photoinitiator is added to the reaction mixture. The photoinitiator is used in a standard amount well known to persons skilled in the art. Suitable photoinitiators include, but are not limited to, 2-hydroxy-1-[4-(hydroxyethyoxy)phenyl]-2-methyl-1-propanone, which is commercially available from Ciba Additives of Hawthorne, N.Y., as IRGACURE 2959, and 2-hydroxy-2-methyl-1-phenyl-1-propanone which also is commercially available from Ciba Additives as DAROCUR 1173.

The multicomponent ion exchange granules can contain individual microdomains that: (a) contain a single acidic resin or (b) contain more than one, i.e., a mixture, of acidic resins. The multicomponent ion exchange granules also can contain microdomains wherein, for the acidic component, a portion of the acidic microdomains comprise a first acidic resin or acidic resin mixture, and the remaining portion comprises a second acidic resin or acidic resin mixture.

Analogous to the acidic resin, the basic resin in the present multicomponent ion exchange granules can be a strong or weak basic resins. The basic resin can be a single resin or a mixture of resins. The basic resin can be a homopolymer or a copolymer. The weak basic resin typically is present in its free base, or neutral, form, i.e., about 75% to about 100% of the basic moieties, e.g., amino groups, are present in a neutral, uncharged form. However, effective ion exchange granules are provided when less than 75% of the basic moieties are in the free base form. The strong basic resins typically are present in the hydroxide (OH) or bicarbonate ($HCO_3$) form.

The basic resin typically is a crosslinked acrylic type resin, such as a poly(vinylamine) or a poly (dialkylaminoalkyl (meth)acrylamide) . The basic resin also can be a polymer such as a lightly crosslinked polyethylenimine, a poly(allylamine), a poly (allylguanidine), a poly(dimethyldiallylammonium hydroxide), a quaternized polystyrene derivative, such as

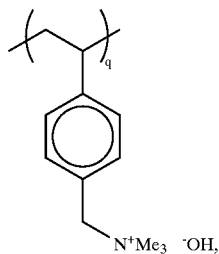

a guanidine-modified polystyrene, such as

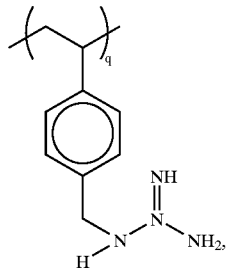

a quaternized poly((meth)acrylamide) or ester analog, such as

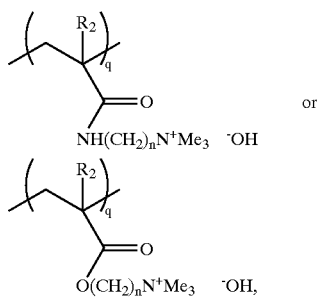

wherein Me is methyl, $R_2$ is hydrogen or methyl, n is a number 1 to 8, and q is a number from 10 to about 100,000, or a poly(vinylguanidine), i.e., poly(VG), a strong basic water-absorbing resin having the general structural formula (V)

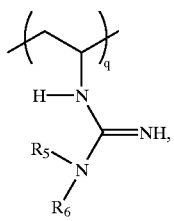 (V)

wherein q is a number from 10 to about 100,000, and $R_5$ and $R_6$, independently, are selected from the group consisting of hydrogen, $C_1$–$C_4$ alkyl, $C_3$–$C_6$ cycloalkyl, benzyl, phenyl, alkyl-substituted phenyl, naphthyl, and similar aliphatic and aromatic groups. The crosslinked basic water-absorbing resin can contain other copolymerizable units and is crosslinked using a polyfunctional organic compound, as set forth above with respect to the acidic resin.

A basic resin used in the present multicomponent ion exchange granules typically contains an amino or a guanidino group. Accordingly, a water-soluble basic resin also can be crosslinked in solution by suspending or dissolving an uncrosslinked basic resin in an aqueous or alcoholic medium, then adding a di- or polyfunctional compound capable of crosslinking the basic resin by reaction with the amino groups of the basic resin, i.e., a latent crosslinking agent.

Such latent crosslinking agents include, for example, multifunctional aldehydes (e.g., glutaraldehyde), multifunctional acrylates (e.g., butanediol diacrylate, TMPTA), halohydrins (e.g., epichlorohydrin), dihalides (e.g., dibromopropane), disulfonate esters (e.g., $ZA(O_2)O$—$(CH_2)_n$—$OS(O)_2Z$. wherein n is 1 to 10, and Z is methyl or tosyl), multifunctional epoxies (e.g., ethylene glycol diglycidyl ether), multifunctional esters (e.g., dimethyl adipate), multifunctional acid halides (e.g., oxalyl chloride), multifunctional carboxylic acids (e.g., succinic acid), carboxylic acid anhydrides (e.g., succinic anhydride), organic titanates (e.g., TYZOR AA from DuPont), melamine resins (e.g., CYMEL 301, CYMEL 303, CYMEL 370, and CYMEL 373 from Cytec Industries, Wayne, N.J.), hydroxymethyl ureas (e.g., N,N'-dihydroxymethyl-4,5-dihydroxy-ethyleneurea), and multifunctional isocyanates (e.g., toluene diisocyanate or methylene diisocyanate). Crosslinking agents also are disclosed in Pinschmidt, Jr. et al. U.S. Pat. No. 5,085,787, incorporated herein by reference, and in EP 450 923.

Conventionally, the crosslinking agent is water or alcohol soluble, and possesses sufficient reactivity with the basic resin such that crosslinking occurs in a controlled fashion, preferably at a temperature of about 25° C. to about 150° C. Preferred crosslinking agents are ethylene glycol diglycidyl ether (EGDGE), a water-soluble diglycidyl ether, and a dibromoalkane.

Examples of latent crosslinking agents for the basic resin include, but are not limited to, ethylene glycol diglycidyl ether, malonic acid, succinic acid, glutaric acid, adipic acid, pimelic acid, 1,2-dibromoethane, 1,3-dibromopropane, 1,4-dibromobutane, 1,5-dibromopentane, 1,6-dibromohexane, 1,7-dibromoheptane, dimethyl malonate, diethyl succinate, dimethyl succinate, dimethyl glutarate, dimethyl adipate, dimethyl pimelate, hexamethylene diisocyanate, and mixtures thereof.

The basic resin, either strongly or weakly basic, typically contains amino or guanidino moieties. Examples of basic resins include a poly(vinylamine), a polyethylenimine, a poly(vinylguanidine), a poly(allylamine), a poly(allylguanidine), or a poly(dialkylaminoalkyl (meth)acrylamide) prepared by polymerizing and crosslinking a monomer having the structure

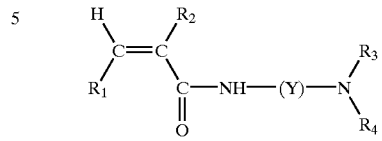

or its ester analog

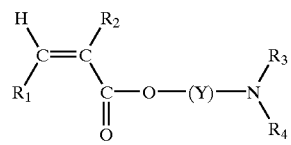

wherein $R_1$ and $R_2$, independently, are selected from the group consisting of hydrogen and methyl, Y is a divalent straight chain or branched organic radical having 1 to 8 carbon atoms, and $R_3$ and $R_4$, independently, are alkyl radicals having 1 to 4 carbon atoms. Preferred basic resins include a poly(vinylamine), polyethylenimine, poly(vinylguanadine), poly(dimethylaminoethyl acrylamide) (poly(DAEA)), and poly-(dimethylaminopropyl methacrylamide) (poly(DMAPMA)). Analogous to microdomains of an acidic resin, the present multicomponent ion exchange granules can contain microdomains of a single basic resin, microdomains containing a mixture of basic resins, or microdomains of different basic resins.

A viscous hydrogel of the acidic resin or the basic resin, containing crosslinks provided by the bulk crosslinking agent alone, or by a combination of bulk and latent crosslinking agents, is dehydrated (i.e., dried) to obtain a crosslinked acidic resin or basic resin in a solid form. The dehydration step can be performed by heating the viscous hydrogel in a forced-air oven to a temperature of about 40° C. to about 220° C., preferably about 120° C. to about 150° C., for a period of time, such as about 1 to about 2 hours, sufficient to form a substantially solid mass of material. Alternatively, the dehydration step can be performed by heating the viscous hydrogel overnight at a temperature of about 60° C. Other methods of dehydration (e.g., use of a dewatering solvent, or azeotropic distillation) known by persons skilled in the art also can be used.

After the dehydration step, the crosslinked acidic or basic resin is comminuted to form particles of the dried polymer. The dried solid polymer granules then can be surface crosslinked with a surface crosslinking agent. The acidic or basic resin granules may be sufficiently internally crosslinked by the bulk crosslinking agent to provide relatively nonswelling, nonabsorbent granules suitable for ion exchange purposes. Surface crosslinking enhances the nonswelling properties of the granules, or provides the crosslinking necessary to provide an ion exchange granule. By "nonswelling," it is meant that the dry granules increase in volume by no more than ten times, and preferably no more than five times after hydration. In contrast, dry SAP particles increase in volume by about 100 to about 200 times after hydration. By "nonabsorbent," it is mean that the granules absorb less than 25, and preferably less than 15, times their weight (AUNL) of tap water. In preferred embodiments, the granules absorb about 1 to about 10 times, and most preferably about 1 to about 5 times, their weight (AUNL) of tap water at room temperature (i.e., 25° C.).

Surface crosslinking is achieved, for example, by coating surfaces of the acidic resin, basic resin, or multicomponent ion exchange granules with a solution of the surface crosslinking agent, and then heating the coated particles at a sufficient temperature for a sufficient time to provide a dry and surface-crosslinked resin.

In accordance with an important feature of the present invention, the polymer granules and/or multicomponent ion exchange resin are surface crosslinked with at least about 1000 ppm, preferably at least about 5000 ppm, and more preferably about 10,000 to about 20,000 ppm of the surface crosslinking agent. The high degree of surface crosslinking ensures an ion exchange granule that is nonswelling. The ion resin granules of the present invention, therefore, can have a soft center or core, and a hard exterior that exhibits excellent mechanical integrity and stability.

Surface crosslinking is achieved by contacting a polymer granule with a solution of a surface crosslinking agent to wet predominantly only the outer surfaces of the polymer particle. Surface crosslinking and drying of the polymer particle then is performed, preferably by heating at least the wetted surfaces of the polymer particles.

Prior methods of performing surface crosslinking of polymer particles are disclosed, for example, in Obayashi U.S. Pat. No. 4,541,871, WO 92/16565, WO 93/05080, Alexander U.S. Pat. No. 4,824,901, Johnson U.S. Pat. No. 4,789,861, Makita U.S. Pat. No. 4,587,308, Tsubakimoto U.S. Pat. No. 4,734,478, Kimura et al. U.S. Pat. No. 5,164,459, DE 40 20 780, and EP 509,708. Surface crosslinking of polymer particles is discussed generally in F. L. Buchholz et al., ed., "Modern Superabsorbent Polymer Technology," Wiley-VCH, New York, N.Y., pages 97–108 (1998).

Typically, the polymer granules are surface treated with a solution of a surface crosslinking agent. The solution contains about 0.01% to about 4%, and preferably about 0.4% to about 2%, by weight, surface crosslinking agent in a suitable solvent, for example, water or an alcohol. The solution can be applied as a fine spray onto the surfaces of freely tumbling polymer granules at a ratio of about 1:0.01 to about 1:0.05 parts by weight of granules to solution of surface crosslinking agent. The surface crosslinking agent is present in an amount of 0% to about 10%, and preferably about 0.1% to about 8%, by weight of the granules. To achieve the full advantage of the present invention, the surface crosslinking agent is present in an amount of about 0.2% to about 7%, by weight of the granules.

To achieve the desired ion exchange properties, the surface crosslinking agent is distributed evenly on the surfaces of the polymer granules. For this purpose, mixing is performed in suitable mixers, e.g., fluidized bed mixers, paddle mixers, a rotating disc mixer, a ribbon mixer, a screw mixer, milling rolls, or twin-worm mixers.

The drying of the surface-treated particles is achieved by heating the surface-treated polymer granules at a suitable temperature, e.g., about 25° C. to about 170° C., preferably about 50° C. to about 165° C., and most preferably about 100° C. to about 160° C. The surface-treated polymer granules are heated for about 30 to about 180 minutes, preferably about 60 to about 150 minutes, to effect surface crosslinking. To achieve the full advantage of the present invention, the polymer granules are heated for about 75 to about 120 minutes.

Ordinary dryers or heating ovens can be used for heating the surface-treated polymer granules. Such heating apparatus includes, for example, an agitated trough dryer, a rotating dryer, a rotating disc dryer, a kneading dryer, a fluidized bed dryer, a pneumatic conveying dryer, and an infrared dryer. However, any other method of reacting the surface crosslinking agent with the polymer to achieve surface crosslinking of the granules, such as microwave energy, can be used. In the surface treating and surface crosslinking steps, the mixer can be used to perform simultaneous mixing and heating of the surface crosslinking agents and polymer granules, if the mixer is of a type that can be heated.

As previously stated, surface treating with a surface crosslinking agent, and subsequent or simultaneous heating, provides additional polymer crosslinks in the vicinity of the surface of the polymer granules. The gradation in crosslinking from the surface of the granules to interior, i.e., the anisotropy of crosslink density, can vary, both in depth and profile. Thus, for example, the depth of surface crosslinking can be shallow, with a relatively sharp transition from a high level to a low level of crosslinking. Alternatively, for example, the depth of surface crosslinking can be a significant fraction of the dimensions of the polymer granule, with a broader transition.

Therefore, as understood in the art, surface-crosslinked polymer granules have a higher level of crosslinking in the vicinity of the surface than in the interior. As used herein, "surface" describes the outer-facing boundaries of the granules. For porous polymer granules, exposed internal surfaces also are included in the definition of surface.

Depending on size, shape, porosity, as well as functional considerations, the degree and gradient of surface crosslinking can vary within a given type of polymer granules. Depending on variations in surface: volume ratio within the polymer granules (e.g., between small and large particles), it is typical for the overall level of surface crosslinking to vary over the group of polymer granules (e.g., is greater for smaller particles).

Surface crosslinking generally is performed after the final boundaries of the polymer granules are essentially established. However, it also is also possible to effect surface crosslinking concurrently with the creation of final boundaries. Furthermore, some additional changes in polymer granule boundaries can occur even after surface crosslinks are introduced. However, any other method of achieving surface crosslinking of the granules, and any other method of drying the granules, such as microwave energy, or the such, can be used.

With respect to acidic resin particles or multicomponent ion exchange granules having an acidic resin on the exterior of the granule, suitable surface crosslinking agents are capable of reacting with carboxylic acid moieties, and thereby surface crosslinking the polymer granule. Preferably, the surface crosslinking agent is alcohol soluble or water soluble, and possesses sufficient reactivity with an acid-containing resin such that crosslinking occurs in a controlled fashion, preferably at a temperature of about 25° C. to about 170° C.

Nonlimiting examples of suitable surface crosslinking agents for acid-containing resins include: (a) polyhydroxy compounds, such as glycols and glycerol; (b) metal salts; (c) quaternary ammonium compounds; (d) a multifunctional epoxy compound; (e) an alkylene carbonate, such as ethylene carbonate or propylene carbonate; (f) a polyaziridine, such as 2,2-bishydroxymethyl butanol tris[3-(1-aziridine propionate)]; (g) a haloepoxy, such as epichlorohydrin; (h) a polyamine, such as ethylenediamine; (i) a polyisocyanate, such as 2,4-toluene diisocyanate; (j) a hydroxyalkylamide as disclosed in U.S. Pat. No. 4,076,917, incorporated herein by reference, such as PRIMID™ XL-552, available from EMS-CHEMIE AG, Dornat, Switzerland; and (k) other crosslinking agents for acid-containing resins known to persons skilled in the art.

Preferred surface crosslinking agents include a multifunctional epoxy compound, like ethylene glycol diglycidyl ether; an alkylene carbonate; or a hydroxyalkylamine (HAA). HAAs are disclosed in Swift et al. U.S. Pat. No. 4,076,917, incorporated herein by reference. An HAA useful in the present invention as a surface crosslinking agent has the following formula:

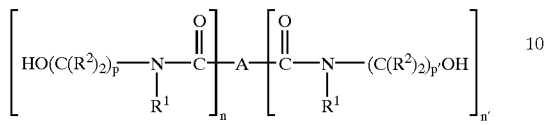

wherein A is a bond, hydrogen, or a monovalent poly-valent organic radical selected from the group consisting of a saturated or unsaturated alkyl radical contain 1 to 60 carbon atoms, such as methyl, ethyl, propyl, butyl, pentyl, hexyl, heptyl, octyl, nonyl, decyl, eicosyl, triacontyl, tetracontyl, pentacontyl, hexylcontyl, and the like, aryl, for example, mono- and dicyclic aryl, such as phenyl, naphthyl, and the like, tri-$C_{1-4}$ alkyleneamine, such as trimethyleneamino, triethyleneamino, and the like, and an unsaturated radical containing one or more ethylenic groups [>C=C<], such as ethenyl, 1-methylethenyl, 3-butenyl-1,3-diyl, 2-propenyl-1, 2-diyl, carboxy $C_{1-4}$ alkenyl, such as 3-carboxy-2-propenyl, and the like, $C_{1-4}$ alkoxy carbonyl lower alkenyl, such as 3-methoxy-carbonyl-2-propenyl, and the like; $R^1$, selected independently, are hydrogen, straight or branched chain $C_{1-5}$ alkyl, such as methyl, ethyl, n-propyl, n-butyl, sec-butyl, tert-butyl, pentyl, and the like, or straight or branched chain $C_{1-5}$ hydroxyalkyl, such as hydroxyethyl, 3-hydroxypropyl, 2-hydroxypropyl, 4-hydroxybutyl, 3-hydroxybutyl, 2-hydroxy-2-methyl-propyl, 5-hydroxypentyl, 4-hydroxypentyl, 3-hydroxypentyl, 2-hydroxypentyl, and the isomers of pentyl; $R^2$, selected independently, are radicals selected from the group consisting of hydrogen and straight or branched $C_{1-5}$ alkyl, or the $R^2$ radicals can be joined to form, together with the carbon atoms, a cycloalkyl ring, such as cyclopentyl, cyclohexyl, and the like; p and p', independently, are an integer 1 to 4; n is an integer having a value of 1 or 2, and n' is an integer having a value of 0 to 2, or when n' is 0, a polymer or copolymer (i.e., n has a value greater than 1, preferably 2–10) formed from the β-hydroxyalkylamide when A is an unsaturated radical.

Preferred HAAs are wherein $R^1$ is H or $C_{1-5}$hydroxyalkyl, n and n' are each 1, —A— is —$(CH_2)_m$—, m is 0–8, preferably 2–8, each $R^2$ on the α-carbon is H, and one of the $R^2$ radicals on the beta carbon in each case is H and the other is H or a $C_{1-5}$ alkyl, and q and q', independently, are an integer 1 to 3; that is,

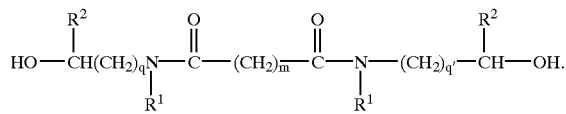

Most preferred HAAs have the formula:

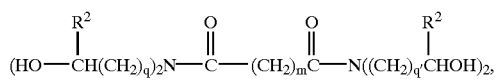

wherein both $R^2$ groups are H or both $R^2$ groups are —$CH_3$.

Specific examples of HAA compounds include, but are not limited to, bis[N,N-di(β-hydroxyethyl)]adipamide, bis [N,N-di(β-hydroxypropyl)]succinamide, bis[N,N-di(β-hydroxyethyl)]azelamide, bis[N-N-di(β-hydroxypropyl)] adipamide, and bis[N-methyl-N-(β-hydroxyethyl)]oxamide. A commercially available 62 -HAA is PRIMID™ XL-552 from EMS-CHEMIE, Dornat, Switzerland. PRIMID™ XL-552 has the structure

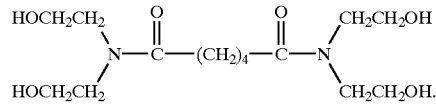

Another commercially available HAA is PRIMID™ QM-1260 from EMS-CHEMIE, having the structure:

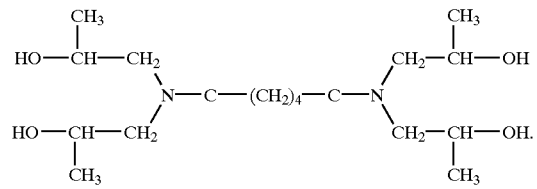

In another embodiment, the HAA has the cyclic structure

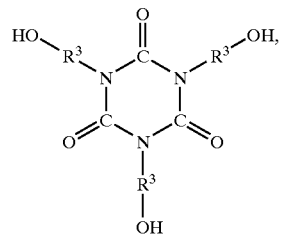

wherein $R^3$ is a divalent radical selected from the group consisting of an alkylene radical containing 1 to 4 carbon atoms and arylene. In preferred embodiments, $R^3$, independently, is $(CH_2)_2$, $(CH_2)_3$, or

With respect to the basic resin particles, or multicomponent ion exchange resins having a basic resin present on the exterior surface of the granules, suitable surface crosslinking agents include di- or polyfunctional molecules capable of reacting with amino groups and crosslinking the resin. Preferably, the surface crosslinking agent is alcohol or water soluble and possesses sufficient reactivity with a resin-containing pendant amino group such that crosslinking occurs in a controlled fashion at a temperature of about 25° C. to about 170° C.

Nonlimiting examples of suitable surface crosslinking agents for resins having pendant amino groups include:
(a) dihalides and disulfonate esters, for example, compounds of the formula Y—$(CH_2)_p$—Y, wherein p is a number from 2 to 12, and Y, independently, is halo (preferably bromo), tosylate, mesylate, or other alkyl or aryl sulfonate esters;
(b) multifunctional aziridines;
(c) multifunctional aldehydes, for example, glutaraldehyde, trioxane, paraformaldehyde, terephthaldehyde, malonaldehyde, and glyoxal, and acetals and bisulfites thereof;

(d) halohydrins, such as epichlorohydrin;

(e) multifunctional epoxy compounds, for example, ethylene glycol diglycidyl ether, bisphenol A diglycidyl ether, and bisphenol F diglycidyl ether, (f) multifunctional carboxylic acids and esters, acid chlorides, and anhydrides derived therefrom, for example, di- and polycarboxylic acids containing 2 to 12 carbon atoms, and the methyl and ethyl esters, acid chlorides, and anhydrides derived therefrom, such as oxalic acid, adipic acid, succinic acid, dodecanoic acid, malonic acid, and glutaric acid, and esters, anhydrides, and acid chlorides derived therefrom;

(g) organic titanates, such as TYZOR AA, available from E.I. DuPont de Nemours, Wilmington, Del.;

(h) melamine resins, such as the CYMEL resins available from Cytec Industries, Wayne, N.J.;

(i) hydroxymethyl ureas, such as N,N'-dihydroxymethyl-4,5-dihydroxyethylene urea;

(j) multifunctional isocyanates, such as toluene diisocyanate, isophorone diisocyanate, methylene diisocyanate, xylene diisocyanate, and hexamethylene diisocyanate;

(k) hydroxyalkylamides as disclosed in U.S. Pat. No. 4,076,917, incorporated herein by reference, such as PRIMID™ XL-552 and QM-1260, available from EMS-CHEMIE AG, Dornat, Switzerland; and (l) other crosslinking agents for amino-containing resins known to persons skilled in the art.

A preferred surface crosslinking agent is a dihaloalkane, a hydroxyalkylamide, ethylene glycol diglycidyl ether (EGDGE), or a mixture thereof, which crosslink a basic resin at a temperature of about 25° C. to about 170° C. Especially preferred surface crosslinking agents are dibromoalkanes containing 3 to 10 carbon atoms and EGDGE.

In addition to, or in lieu of, surface treating, the acidic resin particles, basic resin particles, or entire multicomponent ion exchange granules, or any combination thereof, can be annealed to provide a hard exterior coating. It has been found that heating an acidic or basic resin, or an ion exchange granule, for a sufficient time at a sufficient temperature above the $T_g$ (glass transition temperature) of the resin provides a sufficiently hard shell around a soft interior such that the granule does not swell excessively when contacted by an aqueous fluid.

The preferred multicomponent ion exchange granules of the present invention have mobile carboxyl and amino groups in a soft core or center of the granules. These mobile carboxyl and amino groups are more efficient with respect to exchanging a hydrogen or sodium ion for polyvalent metal ions, or a hydroxide ion for nitrate or sulfate, or other contaminants present in a waste stream, for example. Furthermore, the present granules have a high surface area for more efficient ion exchange.

The present multicomponent ion exchange granules can be prepared by various methods. It should be understood that the exact method of preparing a multicomponent ion exchange granule is not limited by the following embodiments. Any method that provides a particle having at least one microdomain of an acidic resin in contact with or in close proximity to at least one microdomain of a basic resin is suitable.

In one method, dry particles of a basic resin, optionally surface crosslinked and/or annealed, are admixed into a rubbery gel of an acidic resin. The resulting mixture is extruded, then dried, and optionally surface crosslinked and/or annealed, to provide multicomponent ion exchange granules having microdomains of a basic resin dispersed in a continuous phase of an acidic resin. Alternatively, particles of an acidic resin, optionally surface crosslinked and/or annealed, can be admixed into a rubbery gel of a basic resin, and the resulting mixture is extruded and dried, and optionally surface crosslinked and/or annealed, to provide multicomponent ion exchange granules having microdomains of an acidic resin dispersed in a continuous phase of a basic resin.

In another method, dry particles of an acidic resin can be admixed with dry particles of a basic resin, and the resulting mixture is formed into a hydrogel, then extruded, to form multicomponent ion exchange granules.

In yet another method, a rubbery gel of an acidic resin and a rubbery gel of a basic resin, each optionally surface crosslinked and/or annealed, are coextruded, and the coextruded product is dried, and optionally surface crosslinked and/or annealed, to form multicomponent ion exchange granules containing microdomains of the acidic resin and the basic resin dispersed throughout the particle.

The method of preparing the present multicomponent ion exchange granules, therefore, is not limited, and does not require an extrusion step. Persons skilled in the art are aware of other methods of preparation wherein the multicomponent ion exchange granules contain at least one microdomain of an acidic resin and at least one microdomain of a basic resin in contact or in close proximity with each other. One example is agglomeration of fine particles of at least one acidic resin and at least one basic resin with each other, and optionally a matrix resin, to provide a multicomponent ion exchange granule containing microdomains of an acidic and/or basic resin. The multicomponent ion exchange granules can be ground to a desired particle size, or can be prepared by techniques that yield the desired particle size. Other nonlimiting methods of preparing an ion exchange granule of the present invention are set forth in WO 99/25393, incorporated herein by reference.

In embodiments wherein an acidic resin and a basic resin are present as microdomains within a matrix of a matrix resin, particles of an acidic resin and a basic resin are admixed with a rubbery gel of a matrix resin, and the resulting mixture is extruded, then dried, to form multicomponent ion exchange granules having microdomains of an acidic resin and a basic resin dispersed in a continuous phase of a matrix resin. Alternatively, rubbery gels of an acidic resin, basic resin, and matrix resin can be coextruded to provide a multicomponent ion exchange granule containing microdomains of an acidic resin, a basic resin, and a matrix resin dispersed throughout the particle. In this embodiment, the acidic resin, basic resin, and resulting multicomponent ion exchange granule, each can be optionally surface crosslinked and/or annealed.

The matrix resin is any resin that allows fluid transport such that a liquid medium can contact the acidic and basic resin. The matrix resin typically is a hydrophilic resin capable of absorbing water and is nonswelling. Nonlimiting examples of matrix resins include poly(vinyl alcohol), poly (N-vinylformamide), polyethylene oxide, poly(meth) acrylamide, poly(hydroxyethyl acrylate), hydroxyethylcellulose, methylcellulose, and mixtures thereof.

In preferred embodiments, the acidic resin, the basic resin, and/or the multicomponent ion exchange granules are surface treated and/or annealed. Surface treatment and/or annealing results in surface crosslinking of the particle. In especially preferred embodiments, the acidic and/or basic resins comprising the multicomponent ion exchange granules are surface treated and/or annealed, and the entire multicomponent ion exchange granule is surface treated and/or annealed. It has been found that surface treating and/or annealing of an acidic resin, a basic resin, and/or a multicomponent ion exchange granule of the present invention reduces the ability of the resin or multicomponent ion exchange granule to absorb aqueous media and swell.

An ion exchange bed containing the present granules, as opposed to spheres, alters stream flow, which enhances stream distribution and reduces the likelihood of stream channeling through the resin. The enhanced surface area of the present granular ion exchange resin also is useful in remediating heavily particulate-laden streams, such as fermentation broths. In contrast, conventional ion exchange resins are easily fouled by a fermentation broth, thereby reducing their ability to remove proteins from fermentation broths and agricultural by-products.

The ion exchange granules of the present invention can be used to remove contaminant ions from aqueous and solvent streams. More specifically, the granules can be used in the purification of water, including the removal and recovery of heavy and transition metals, or unwanted anions, from water and various anions. For example, the granules of the present invention are more effective at removing nitrate, sulfate, and low levels of soluble and precipitated lead or nitrate ion present in water than conventional ion exchange resins. Furthermore, the high surface crosslinking of the resin gives the granules an ability to more effectively chelate ions, thereby allowing removal of metal ions under conditions where traditional ion exchange resins were not effective. The present ion exchange granules also can be used in the removal of temporary hardness in water resulting from bicarbonate alkalinity, and in pH buffering operations.

In accordance with an important feature of the present invention, a strong acidic resin can be used with either a strong basic resin or a weak basic resin, or a mixture thereof. A weak acidic resin can be used with a strong basic resin or a weak basic resin, or a mixture thereof. Preferably, the acidic resin is a weak acidic resin and the basic resin is a weak basic resin. This result is unexpected in view of the ion exchange art wherein a combination of a weak acidic resin and a weak basic resin does not perform as well as other combinations, e.g., a strong acidic resin and a strong basic resin. In more preferred embodiments, the weak acidic resin, the weak basic resin, and/or the multicomponent ion exchange granules are surface crosslinked and/or annealed.

In the present multicomponent ion exchange granules, the basic resin can be present in its free base, e.g., amine, form, and the acidic resin can be present in its free acid form. In addition, the amine and/or acid functionalities can be in their charged form, i.e., each resin individually having a DN=0 to DN=100. A strong basic resin is present in the hydroxide or bicarbonate, i.e., charged form. The percentage of charged functionalities, i.e., the DN, is selected based on the liquid to treated and the ions to be removed from the liquid.

Other uses for the present multicomponent ion exchange granules include pharmaceutical separation processes, such as, for example, extraction and purification of cephalosporin or extraction of streptomycin and neomycin (antibodies) from fermentation broths; precoat filtration processes used in condensate polishing and sugar processing; debittering of juices and wines; exchange media in chromatographic separations; as carriers for the delayed release of drugs; and adsorption and buffering agents in topical medicines.

EXAMPLES

The following nonlimiting example is provided to illustrate the present invention, but are not intended to limit the scope thereof. In the test results set forth below, the ion exchange granules of the present invention were tested for absorption under no load (AUNL) and absorption under load at 0.28 psi (AUL (0.28 psi)). Absorption under load (AUL) is a measure of the ability of a polymer particle to absorb fluid under an applied pressure. The AUL was determined by the following method, as disclosed in U.S. Pat. No. 5,149,335, incorporated herein by reference.

Particles of an ion exchange resin (0.160 g +/−0.001 g) are carefully scattered onto a 140-micron, water-permeable mesh attached to the base of a hollow Plexiglas cylinder with an internal diameter of 25 mm. The sample is covered with a 100 g cover plate and the cylinder assembly weighed. This gives an applied pressure of 20 $g/cm^2$ (0.28 psi). The screened base of the cylinder is placed in a 100 mm petri dish containing 25 milliliters of a test solution (usually 0.9% saline), and the polymer is allowed to absorb for 1 hour (or 3 hours). By re-weighing the cylinder assembly, the AUL (at a given pressure) is calculated by dividing the weight of liquid absorbed by the dry weight of polymer before liquid contact.

The ion exchange resins also can be tested for weight percent of extractable materials. In this test, the ion exchange resin (0.400 g) was weighed into a 150 ml beaker containing a stir bar. Then 75 ml of 0.9 wt. % aqueous NaCl was added to the beaker. The resulting mixture was stirred at 300 rpm for 16 hours. The sample then was filtered, and 40 ml of the filtrate was titrated with 0.1 M HCl to a pH of 2.7. The volume of acid required to attain pH 2.7 was correlated to the amount of soluble polymer extracted from the ion exchange resin.

The ion exchange resins were tested for ion exchange capacity (as meq of titratable acid groups per gram of resin) by the following method. A 0.5 gram sample of the ion exchange resin in the hydrogen form was stirred in 15 g of 1 M sodium hydroxide (NaOH) for three hours at 150 rpm. The sample then was filtered, and 20 ml of deionized (DI) water was added to the filtrate. The filtrate was titrated with 0.5 N hydrochloric acid (HCl) to determine the amount of NaOH consumed by the resin, which then is correlated to the ion exchange capacity of the resin.

The diameter of the hydrated ion exchange granules were measured with a Coulter LS230 particle size analyzer. The measurements were made in deionized water.

The following example illustrates the improved ion exchange resins of the present invention. The present ion exchange resins demonstrate (a) an increased mechanical strength with respect to the processing and end use conditions experienced by ion exchange resins, (b) resistance to hydrolysis by acids and bases that are used to treat the resin before use and to regenerate the resin, and (c) an equivalent or improved ability to remove high pH lead, hardness, alkalinity, sulfate, and nitrate from aqueous streams than current commercial ion exchange resins.

Example 1

A monomer mixture containing about 25 wt. % acrylic acid, about 75% DI water, 0.26 mol % triallylamine (TAA as a bulk crosslinking agent), and 1.0 mol % diethylenetriamine (DETA) was prepared and cooled to about 10° C. The initiator (DAROCUR 1173, 0.02 mol %) was added to the cooled monomer solution, and the mixture then was photopolymerized using UV light. The resulting acidic resin hydrogel was extruded.

Independently, to an aqueous poly(vinylamine) solution (concentration of about 5 wt. %) was added DENECOL EX-810 (i.e., EGDGE) to give a cross-linking concentration of about 10 mol % based on the vinylamine repeating units. The resulting solution was mixed until homogeneous, and the polymer was cured at 60° C. for two hours to crosslink the poly(vinylamine) and provide a gel of the basic resin.

A blend of the acidic and basic resin gels was prepared. The blend contained a ratio of about 55 wt. % poly(acrylic acid) gel to about 45 wt. % of poly(vinylamine) gel. The two gels were blended together and then extruded several times to provide a uniform mixture. Two individual samples of the mixture then were dried and cured at 155° C. for 2 or 4 hours, respectively. The cured multicomponent ion exchange granules then were milled and sized to provide granules having a diameter of about 180 μm to about 710 μm.

Both samples of the multicomponent ion exchange granules exhibited an AUNL of about 14 g/g in tap water and an AUNL value of between 20 and 24 g/g in 0.9 wt. saline. These multicomponent ion exchange granules had a cation exchange capacity of 7 meq/g and a median particle size distribution of about 1144 μm.

Example 2

A monomer mixture containing about 25 wt. % acrylic acid, about 75 wt. % deionized (DI) water, 0.1 mol % triallyl pentaerythritol ether (TAPE), and 3 mol % diethylenetriamine (DETA) was prepared, then cooled to about 10° C. The initiator (DAROCUR 1173, 0.02 mol %) was added to the cooled monomer solution, and the resulting mixture then was photopolymerized using UV light. The resulting acidic resin hydrogel was extruded.

Independently, an aqueous branched poly-ethylenimine solution (about 33 wt. %), DENECOL EX-810 (0.5 mol % based on ethylenimine repeat units), and succinic acid (2.5 mol % based on ethylenimine repeat units) were admixed. The resulting solution was mixed until homogeneous, then cured at 60° C. for two hours to crosslink the polyethylenimine and provide a basic resin hydrogel.

A blend of the acidic and basic resin hydrogels was prepared. The blend contained a ratio of about 50 wt. % poly(acrylic acid) gel and 50 wt. % polyethylenimine gel. The two gels were admixed, then extruded several times to provide a uniform mixture. The resulting resin then was cured at 165° C. for two hours. The cured multicomponent ion exchange resin then was milled and sized to provide granules having a diameter of about 180 μm to 710 μm. The resulting resin granules had an AUNL (tap water) of 2.2 g/g.

Example 3

Nitrate vs. Sulfate Selectivity

The nitrate vs. sulfate selectivity of the multicomponent ion exchange resin of Example 1 was tested in comparison to the selectivity for a commercially available nitrate-selective, strong base resin (Sybron SR-7) using the procedure described in M. Cox et al., *Chem. Ind.*, 5, 161–162 (1981). In this experiment, a sample of the ion exchange resin was stirred in a solution that contained a mixture of sodium nitrate and sodium sulfate. The ratio of polymer to sodium nitrate and sodium sulfate was set such that there was about two moles of sodium sulfate per exchangeable site on the polymer. In one set of experiments, about 25 mg of the ion exchange resin from Example 2 was placed into each of six containers and the mole ratio of nitrate to sulfate was varied from 0 to 1. In a second experiment, about 120 mg of the Sybron SR-7 resin was placed into each of the containers and again the mole ratio of nitrate to sulfate was varied between 0 and 1. The samples were stirred at room temperature for about 16 hours. Then, the solutions were tested for sulfate and nitrate content by ion chromatography. The following table summarizes the data obtained from these experiments.

| Initial NO$_3$ Mole Fraction | Example 2 NO$_3$ Mole Fraction | Sybron Resin NO$_3$ Mole Fraction |
|---|---|---|
| 0 | 0 | 0 |
| 0.2 | 0.20 | 0.153 |
| 0.4 | 0.40 | 0.265 |
| 0.6 | 0.63 | 0.484 |
| 0.8 | 0.83 | 0.731 |
| 1 | 1 | 1 |

Figure 6:
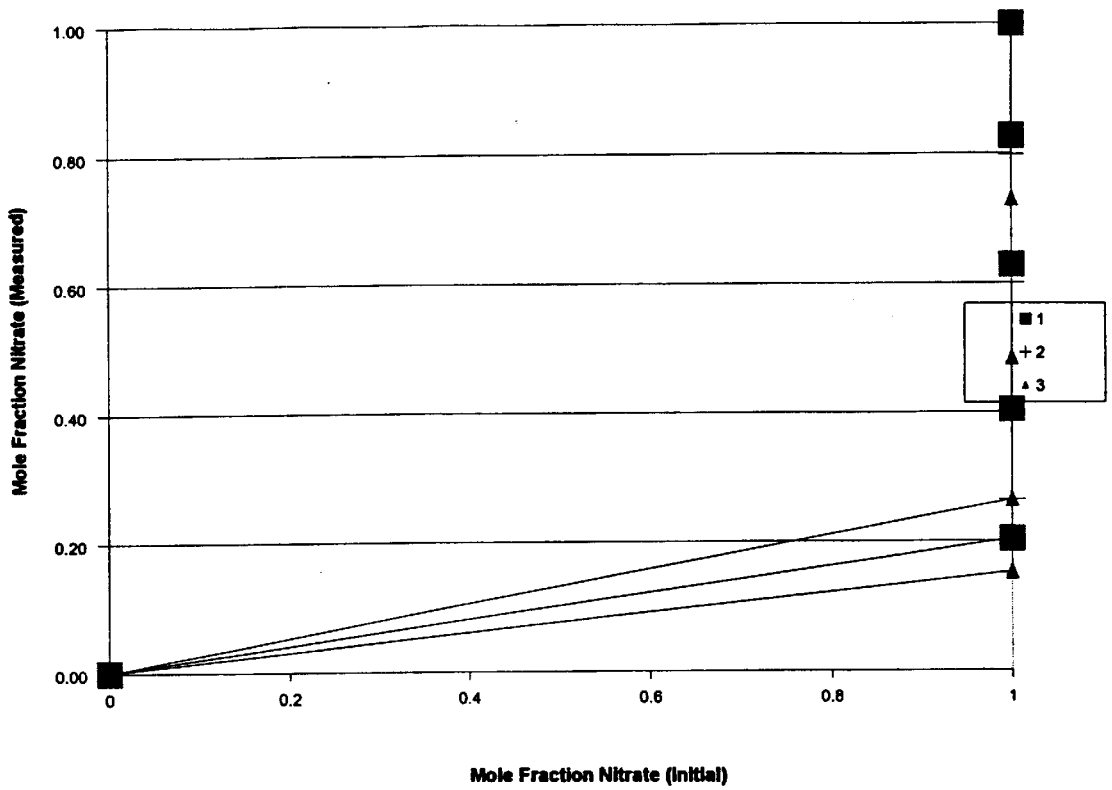
FIG. 6 contains plots of mole fraction nitrate (measured) vs. mole fraction nitrate (initial) comparing the nitrate-removal ability of multicomponent ion exchange granules of the present invention to a commercial control ion exchange resin.

FIG. 6 illustrates the data obtained for these experiments. The Sybron SR-7 resin shows preference for removing nitrate over sulfate across the entire range of nitrate and sulfate concentrations tested. The multicomponent ion exchange resin of Example 1, however, removes nitrate at the same efficiency that it removes sulfate.

The resin of Example 2 exhibits the advantage of removing more nitrate on a mass basis than the Sybron SR-7 resin of Example 3 (0.18 mg nitrate/-mg resin vs. 0.11 mg nitrate/mg resin, respectively) at the highest concentration of nitrate used in the experiment described above. In addition, the resin of Example 2 retains an ability to remove hardness, alkalinity, and other positively charged metal ions due to the presence of acidic carboxylate groups in the multicomponent ion exchange resin.

Example 4

An axial flow water purification cartridge is constructed using 2 inch diameter polyvinylchloride tubing and suitable end caps and filters to maintain the filter media in the cartridge under line pressure. One cartridge is gravity packed with 11 ml of a powdered activated carbon (PAC, NORIT 211) and 11 ml of hydrated multicomponent ion exchange resin, as described in the above Example 2. A control cartridge that contains solely 22 ml of PAC also is prepared. The cartridges are tested on a cycle tester that runs the samples on a ten minutes on/ten minutes off cycle, and samples are tested every other cycle. The line pressure is 50 psi and the influent water contains about 102 ppm alkalinity (as CaCO$_3$), 140 ppm hardness (as CaCO$_3$), and 2 ppm chlorine.

The control cartridge containing solely PAC removes essentially no hardness. The cartridge containing a mixture of multicomponent ion exchange resin and PAC removes a substantial amount of the hardness, and continues to remove hardness even after numerous cycles.

The cartridge of the present invention also removes alkalinity through the complete testing cycle, whereas the control cartridge containing only PAC fails to remove an appreciable amount of alkalinity. Both cartridges completely remove chlorine from the influent throughout the testing cycle.

Similar to the axial flow column of Example 4, a cartridge having a radial flow geometry also can be used to remove hardness, alkalinity, and chlorine from a water stream.

A water purification cartridge containing an ion exchange resin of the present invention can contain other adsorbents in addition to, or in place of, powdered activated carbon, for example, a zeolite, a polystyrene adsorbent resin, or a polyacrylate adsorbent resin, such as XAD-4 and XAD-7, available from Rohm and Haas Co., Philadelphia, Pa., or mixtures thereof, or can be free of such additional adsorbents.

The foregoing description is given for clearness of understanding only, and no unnecessary limitations should be understood therefrom, as modifications within the scope of the invention can be apparent to those skilled in the art.

What is claimed is:

1. A multicomponent ion exchange resin comprising dry granules, wherein each granule comprises at least one microdomain of at least one basic resin dispersed in a continuous phase of at least one acidic resin, wherein the granules have an absorbance under no load of 25 grams or less of tap water per gram of granules, and, after hydration, have a volume no more than ten times greater than a volume of the granules prior to hydration, wherein the basic resin is selected from the group consisting of a poly(vinylamine), a poly(dialkylaminoalkyl (meth)acrylamide), a polymer prepared from the ester analog of an N-(dialkyamino (meth)acrylamide), a polyethylenimine, a poly(vinylguanidine) a poly (allylguanidine), a poly(allylamine), a poly (dimethyldialkylammonium hydroxide), a guanidine-modified polystyrene, a quaternized polystyrene, a quaternized poly(meth)acrylamide or ester analog thereof, poly(vinyl alcohol-co-vinylamine), and mixtures thereof, and wherein the acidic resin is selected from the group consisting of polyacrylic acid, a hydrolyzed starch-acrylonitrile graft copolymer, a starch-acrylic acid graft copolymer, a saponified vinyl acetate-acrylic ester copolymer, a hydrolyzed acrylonitrile polymer, a hydrolyzed acrylamide copolymer, an ethylene-maleic anhydride copolymer, an isobutylene-maleic anhydride copolymer, a poly(vinylphosphonic acid), a poly (vinylsulfonic acid), a poly(vinylphosphoric acid), a poly(vinylsulfuric acid), a sulfonated polystyrene, a poly(aspartic acid), a poly(lactic acid), and mixtures thereof.

2. The resin of claim 1 having a weight ratio of acidic resin to basic resin of about 90:10 to about 10:90.

3. The resin of claim 1 containing about 50% to 100%, by weight, of basic resin plus acidic resin.

4. The resin of claim 1 wherein the particle is about 1 to about 10,000 microns in diameter.

5. The ion exchange resin of claim 1 wherein the granules have an absorbance under no load of about 1 to about 15 grams of tap water per gram of granules.

6. The ion exchange resin of claim 1 wherein the granules have an absorbance under no load of about 1 to about 5 grams of tap water per gram of granules.

7. The ion exchange resin of claim 1 wherein the volume of hydrated granules is no more than five times greater than the volume of the granules prior to hydration.

8. The resin of claim 1 wherein the basic resin is annealed at a temperature of about 65° C. to about 185° C. for about 20 minutes to about 16 hours.

9. The resin of claim 1 wherein the basic resin is surface crosslinked with up to about 2% by weight of the resin of a surface crosslinking agent.

10. The resin of claim 9 wherein the surface crosslinking agent is selected from the group consisting of (a) a dihalide or a disulfonate ester having the formula

wherein p is an integer 2 to 12 and Y, independently, is halo, tosylate, mesylate, an alkyl sulfonate ester, or an aryl sulfonate ester;

(b) a multifunctional aziridine;

(c) a multifunctional aldehyde, and acetals and bisulfites thereof;

(d) a halohydrin;

(e) a multifunctional epoxy compound;

(f) a multifunctional carboxylic acid containing 2 to 12 carbon atoms, and methyl and ethyl esters, acid chlorides, and anhydrides derived therefrom;

(g) an organic titanate;

(h) a melamine resin;

(i) a hydroxymethyl urea;

(j) a multifunctional isocyanate;

(k) a hydroxyalkylamide; and (l) mixtures thereof.

11. The resin of claim 1 wherein the resin is surface crosslinked with up to about 20,000 ppm of a surface crosslinking agent.

12. The resin of claim 1 wherein the resin is annealed at a temperature of about 65° C. to about 185° C. for about 20 minutes to about 16 hours.

13. The resin of claim 1 wherein the basic resin has a DN of 0% to 100%.

14. The resin of claim 1 wherein at least 50% of the monomer units comprising the basic resin are basic monomer units.

15. The resin of claim 1 wherein the acidic resin has a DN of 0% to 100%.

16. The resin of claim 1 wherein at least 50% of the monomer units comprising the acidic resin are acidic monomer units.

17. The resin of claim 1 wherein the basic resin comprises a poly(vinylamine), a poly(dialkyl-aminoalkyl (meth) acrylamide), a poly(vinylguanidine), a polyethylenimine, or a mixture thereof, and the acidic resin comprises poly (acrylic acid).

18. The resin of claim 1 wherein the acidic resin and/or basic resin contain a latent crosslinking agent selected from the group consisting of a compound having at least one polymerizable double bond and at least one functional group reactive with an acid group or an amino group, a compound having at least two functional groups reactive with an acid group or an amino group, a polyvalent metal compound capable of forming ionic crosslinkages with acid groups, and mixtures thereof.

19. The resin of claim 18 wherein the latent crosslinking agent for the acidic resin is selected from the group consisting of a polyhydroxy compound, a polyvalent metal salt, a quaternary ammonium compound, a multifunctional epoxy compound, an alkylene carbonate, a polyaziridine, a haloepoxy, a polyamine, a polyisocyanate, a hydroxyalkylamide, a hydroxyalkyl (meth)acrylate, an aminoalkyl (meth)acrylate, and mixtures thereof.

20. The resin of claim 19 wherein the latent crosslinking agent is selected from the group consisting of a glycol, a triol, a polyol, ethylene glycol, propylene glycol, 1,3-butylene glycol, glycerol, ethylene glycol diglycidyl ether, ethylene carbonate, propylene carbonate, 2,2-bishydroxymethyl butanol tris[3-(1-aziridine propionate]), epichlorohydrin, ethylenediamine, diethylenetriamine, tris (2-aminoethyl)amine, 1,3-diaminopropane, 1,6-diaminohexane, triethylenetetraamine, 1,4-diaminobutane, 1,5-diaminopentane, 2,4-toluene diisocyanate, bis[N,N-di (β-hydroxyethyl)]adipamide, bis[N,N-di(β-hydroxypropyl)] succinamide, bis[N,N-di(β-hydroxyethyl)]azelamide, bis[N,N-di(β-hydroxypropyl)]adipamide, bis[N-methyl-N-(β-hydroxyethyl)]oxamide, hydroxyethyl acrylate, hydroxypropyl methacrylate, aminoethyl acrylate, aminopropyl methacrylate, and mixtures thereof.

21. The ion exchange resin of claim 18 wherein the latent crosslinking agent for the basic resin is selected from the group consisting of a multifunctional aldehyde, a multifunctional (meth)acrylate, a halohydrin, a dihalide, a disulfonate ester, a multifunctional epoxide, a multifunctional ester, a multifunctional acid halide, a multifunctional carboxylic acid, a carboxylic acid anhydride, an organic titanate, a melamine resin, a hydroxyethyl urea, a multifunctional isocyanate, and mixtures thereof.

22. The ion exchange resin of claim 21 wherein the latent crosslinking agent is selected from the group consisting of ethylene glycol diglycidyl ether, malonic acid, succinic acid, glutaric acid, adipic acid, pimelic acid, 1,2-dibromoethane, 1,3-dibromopropane, 1,4-dibromobutane, 1,5-dibromopentane, 1,6-dibromohexane, 1,7-dibromoheptane, dimethyl malonate, diethyl succinate, dimethyl succinate, dimethyl glutarate, dimethyl adipate, dimethyl pimelate, hexamethylene diisocyanate, and mixtures thereof.

23. The ion exchange resin of claim 18 containing the latent crosslinking agent in an amount of 0 to about 6 mole %, based on the total moles of the monomers.

24. The resin of claim 1 wherein the acidic resin surface is crosslinked with a surface crosslinking agent selected from the group consisting of a polyhydroxy compound, a metal salt, a quaternary ammonium compound, a multifunctional epoxy compound, an alkylene carbonate, a polyaziridine, a haloepoxide, a polyamine, a polyisocyanate, a hydroxyalkylamide, a multifunctional epoxy compound, a triol, a glycol, and mixtures thereof.

25. The resin of claim 24 wherein the surface crosslinking agent is selected from the group consisting of propylene glycol, ethylene glycol diglycidyl ether, ethylene carbonate, propylene carbonate, ethylenediamine, diethylenetriamine, 1,3-di-aminopropane, 1,6-diaminohexane, triethylenetetraamine, 1,4-diaminobutane, 1,5-diaminopentane, polyethylenimine, tris(2-aminoethyl)amine, bis[N,N-di(β-hydroxyethyl)]adipamide, bis[N,N-di(β-hydroxypropyl)]succinamide, bis[N,N-di(β-hydroxyethyl)]azelamide, bis[N,N-di(β-hydroxypropyl)]adipamide, bis[N-methyl-N-(β-hydroxyethyl)]oxamide, and mixtures thereof.

26. The resin of claim 9 wherein the surface crosslinking agent is present in an amount of at least about 1,000 ppm.

27. The resin of claim 9 wherein the surface crosslinking agent is present in an amount of at least about 5,000 ppm.

28. The resin of claim wherein the surface crosslinking agent is present in an amount of about 10,000 to about 20,000 ppm.

29. A multicomponent ion exchange resin comprising dry granules, wherein each granule comprises at least one microdomain of at least one acidic resin dispersed in a continuous phase of at least one basic resin, wherein the granules have an absorbance under no load of 25 grams or less of tap water per gram of granules, and, after hydration, have a volume no more than ten times greater than a volume of the granules prior to hydration, wherein the basic resin is selected from the group consisting of a poly(vinylamine), a poly(dialkylaminoalkyl (meth)acrylamide), a polymer prepared from the ester analog of an N-(dialkyamino(meth)acrylamide), a polyethylenimine, a poly(vinylguanidine) a poly (allylguanidine), a poly(allylamine), a poly (dimethyldialkylammonium hydroxide), a guanidine-modified polystyrene, a quaternized polystyrene, a quaternized poly(meth)acrylamide or ester analog thereof, poly(vinyl alcohol-co-vinylamine), and mixtures thereof, and wherein the acidic resin is selected from the group consisting of polyacrylic acid, a hydrolyzed starch-acrylonitrile graft copolymer, a starch-acrylic acid graft copolymer, a saponified vinyl acetate-acrylic ester copolymer, a hydrolyzed acrylonitrile polymer, a hydrolyzed acrylamide copolymer, an ethylene-maleic anhydride copolymer, an isobutylene-maleic anhydride copolymer, a poly(vinylphosphonic acid), a poly (vinylsulfonic acid), a poly(vinylphosphoric acid), a poly(vinylsulfuric acid), a sulfonated polystyrene, a poly(aspartic acid), a poly(lactic acid), and mixtures thereof.

30. A multicomponent ion exchange resin comprising dry granules, wherein each granule comprises at least one microdomain of at least one basic resin and at least one microdomain of at least one acidic resin dispersed in a continuous phase of a matrix resin, wherein the granules have an absorbance under no load of 25 grams or less of tap water per gram of granules, and, after hydration, have a volume no more than ten times greater than a volume of the granules prior to hydration, wherein the basic resin is selected from the group consisting of a poly(vinylamine), a poly(dialkylaminoalkyl (meth)acrylamide), a polymer prepared from the ester analog of an N-(dialkyamino(meth)acrylamide), a polyethylenimine, a poly(vinylguanidine) a poly (allylguanidine), a poly(allylamine), a poly (dimethyldialkylammonium hydroxide), a guanidine-modified polystyrene, a quaternized polystyrene, a quaternized poly(meth)acrylamide or ester analog thereof, poly(vinyl alcohol-co-vinylamine), and mixtures thereof, and wherein the acidic resin is selected from the group consisting of polyacrylic acid, a hydrolyzed starch-acrylonitrile graft copolymer, a starch-acrylic acid graft copolymer, a saponified vinyl acetate-acrylic ester copolymer, a hydrolyzed acrylonitrile polymer, a hydrolyzed acrylamide copolymer, an ethylene-maleic anhydride copolymer, an isobutylene-maleic anhydride copolymer, a poly(vinylphosphonic acid), a poly (vinylsulfonic acid), a poly(vinylphosphoric acid), a poly(vinylsulfuric acid), a sulfonated polystyrene, a poly(aspartic acid), a poly(lactic acid), and mixtures thereof.

31. A multicomponent ion exchange resin comprising dry granules, wherein each granule comprises at least microdomain of at least one basic resin in contact with at least one microdomain of at least one acidic resin, wherein the granules have an absorbance under no load of 25 grams or less of tap water per gram of granules, and, after hydration, have a volume no more than ten times greater than a volume of the granules prior to hydration, wherein the basic resin is selected from the group consisting of a poly(vinylamine), a poly(dialkylaminoalkyl (meth)acrylamide), a polymer prepared from the ester analog of an N-(dialkyamino(meth)acrylamide), a polyethylenimine, a poly(vinylguanidine) a poly (allylguanidine), a poly(allylamine), a poly (dimethyldialkylammonium hydroxide), a guanidine-modified polystyrene, a quaternized polystyrene, a quaternized poly(meth)acrylamide or ester analog thereof, poly(vinyl alcohol-co-vinylamine), and mixtures thereof, and wherein the acidic resin is selected from the group consisting of polyacrylic acid, a hydrolyzed starch-acrylonitrile graft copolymer, a starch-acrylic acid graft copolymer, a saponified vinyl acetate-acrylic ester copolymer, a hydrolyzed acrylonitrile polymer, a hydrolyzed acrylamide copolymer, an ethylene-maleic anhydride copolymer, an isobutylene-maleic anhydride copolymer, a poly(vinylphosphonic acid), a poly(vinylsulfonic acid), a poly(vinylphosphoric acid), a poly(vinylsulfuric acid), a sulfonated polystyrene, a poly(aspartic acid), a poly(lactic acid), and mixtures thereof.

32. A multicomponent ion exchange resin comprising dry granules, wherein each granule comprises at least one microdomain of an acidic resin in close proximity to at least one microdomain of a basic resin, wherein the granules have an absorbance under no load of 25 grams or less of tap water per gram of granules, and, after hydration, have a volume no more than ten times greater than a volume of the granules prior to hydration, wherein the basic resin is selected from the group consisting of a poly(vinylamine), a poly(dialkylaminoalkyl (meth)acrylamide), a polymer prepared from the ester analog of an N-(dialkyamino(meth)acrylamide), a polyethylenimine, a poly(vinylguanidine) a poly(allylguanidine), a poly(allylamine), a poly(dimethyldialkylammonium hydroxide), a guanidine-modified polystyrene, a quaternized polystyrene, a quaternized poly(meth)acrylamide or ester analog thereof, poly(vinyl alcohol-co-vinylamine), and mixtures thereof, and wherein the acidic resin is selected from the group consisting of polyacrylic acid, a hydrolyzed starch-acrylonitrile graft copolymer, a starch-acrylic acid graft copolymer, a saponified vinyl acetate-acrylic ester copolymer, a hydrolyzed acrylonitrile polymer, a hydrolyzed acrylamide copolymer, an ethylene-maleic anhydride copolymer, an isobutylene-maleic anhydride copolymer, a poly(vinylphosphonic acid), a poly(vinylsulfonic acid), a poly(vinylphosphoric acid), a poly(vinylsulfuric acid), a sulfonated polystyrene, a poly(aspartic acid), a poly(lactic acid), and mixtures thereof.

* * * * *

UNITED STATES PATENT AND TRADEMARK OFFICE
CERTIFICATE OF CORRECTION

PATENT NO. : 6,534,554 B1 Page 1 of 1
DATED : March 18, 2003
INVENTOR(S) : Michael A. Mitchell et al.

It is certified that error appears in the above-identified patent and that said Letters Patent is hereby corrected as shown below:

Column 33,
Line 22, "N-(dialkyamino (meth)" should be -- N- (dialkylamino(meth) --
Line 23, "a poly(vinylguanidine)" should be -- a poly(vinylguanidine), --

Column 35,
Line 52, "claim wherein" should be -- claim 9 wherein --
Line 66, "N-(dialkyamino(meth)" should be -- N-(dialkylamino(meth) --
Line 67, "a poly(vinylguanidine)" should be -- a poly(vinylguanidine), --

Column 36,
Lines 31 and 62, "N-(dialkyamino(meth)" should be -- N-(dialkylamino(meth) --
Lines 32 and 63, "a poly(vinylguanidine)" should be -- a poly(vinylguanidine), --
Line 52, "at least microdomain" should be -- at least one microdomain --

Column 38,
Line 2, "N-(dialkyamino(meth)" should be -- N-(dialkylamino(meth) --
Line 3, "a poly(vinylguanidine)" should be -- a poly(vinylguanidine), --

Signed and Sealed this

Seventeenth Day of February, 2004

JON W. DUDAS
*Acting Director of the United States Patent and Trademark Office*